(12) United States Patent
Gormley et al.

(10) Patent No.: US 11,310,676 B2
(45) Date of Patent: Apr. 19, 2022

(54) METHODS FOR MITIGATING INTERFERENCE AND MAXIMIZING CAPACITY FOR TIME DIVISION DUPLEX CELLULAR NETWORKS

(71) Applicant: Spectrum Effect Inc., Kirkland, WA (US)

(72) Inventors: Eamonn Gormley, Redmond, WA (US); Jungnam Yun, Redmond, WA (US); Charles Immendorf, Seattle, WA (US)

(73) Assignee: Spectrum Effect Inc., Kirkland, WA (US)

( * ) Notice: Subject to any disclaimer, the term of this patent is extended or adjusted under 35 U.S.C. 154(b) by 87 days.

(21) Appl. No.: 16/542,223

(22) Filed: Aug. 15, 2019

(65) Prior Publication Data

US 2020/0344619 A1 Oct. 29, 2020

Related U.S. Application Data

(60) Provisional application No. 62/837,259, filed on Apr. 23, 2019.

(51) Int. Cl.
*H04W 24/00* (2009.01)
*H04W 24/02* (2009.01)
*H04W 76/10* (2018.01)
*H04L 5/14* (2006.01)

(52) U.S. Cl.
CPC .............. *H04W 24/02* (2013.01); *H04L 5/14* (2013.01); *H04W 76/10* (2018.02)

(58) Field of Classification Search
CPC . H04W 24/02; H04W 76/10; H04W 28/0236; H04L 5/14; H04J 3/14; H04B 1/7097
See application file for complete search history.

(56) References Cited

U.S. PATENT DOCUMENTS

| | | | |
|---|---|---|---|
| 10,117,248 B1* | 10/2018 | Wurtenberger | ... H04W 28/0236 |
| 2007/0202921 A1 | 8/2007 | Stern-Berkowitz et al. | |
| 2013/0322289 A1* | 12/2013 | Zhu | ........................ H04J 11/0056 370/252 |
| 2017/0222785 A1 | 8/2017 | Li et al. | |
| 2017/0303144 A1* | 10/2017 | Guo | .................. H04W 74/0808 |
| 2019/0342057 A1* | 11/2019 | Rico Alvarino | ...... H04L 5/1461 |

FOREIGN PATENT DOCUMENTS

KR 20190073189 A 6/2019

OTHER PUBLICATIONS

International Search Report and Written Opinion for PCT/US2020/046699, dated Dec. 7, 2020.

* cited by examiner

*Primary Examiner* — Shukri Taha

(57) ABSTRACT

Time division duplexed (TDD) Cellular networks can experience interference in receive times from downlink transmissions by aggressor cells after network changes, or from tropospheric ducting. The interference from the aggressor cells can be efficiently mitigated by determining that the victim cell is being affected by such interference, identifying the aggressor cells, and selectively increasing the guard time between the aggressor cells and the victim cell.

19 Claims, 12 Drawing Sheets

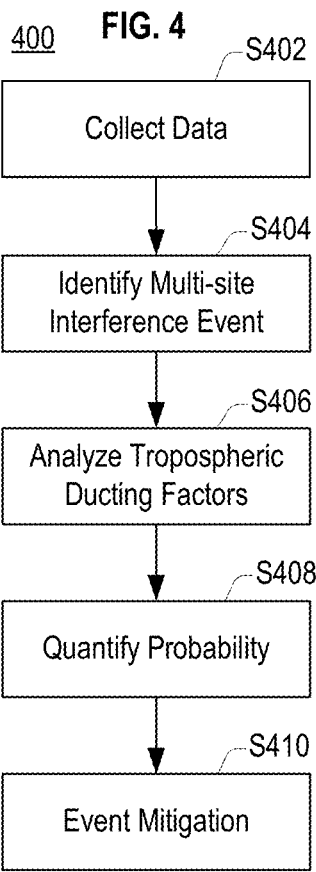
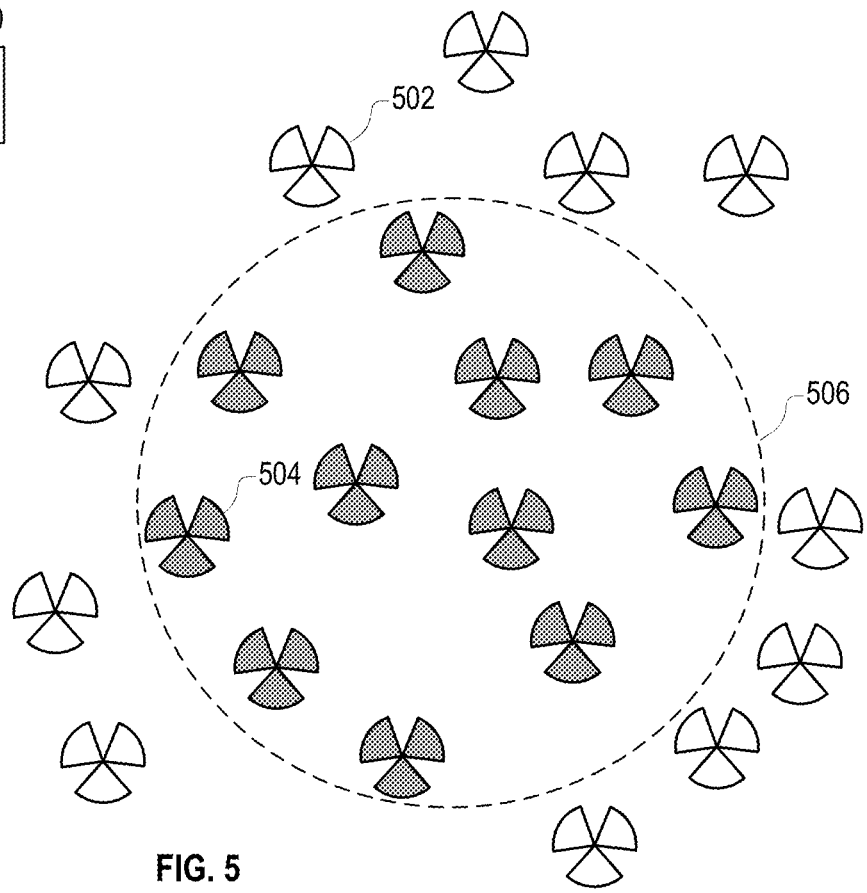
FIG. 5

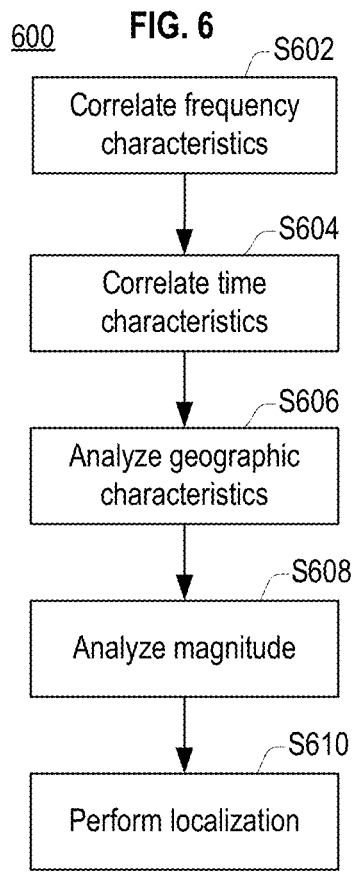
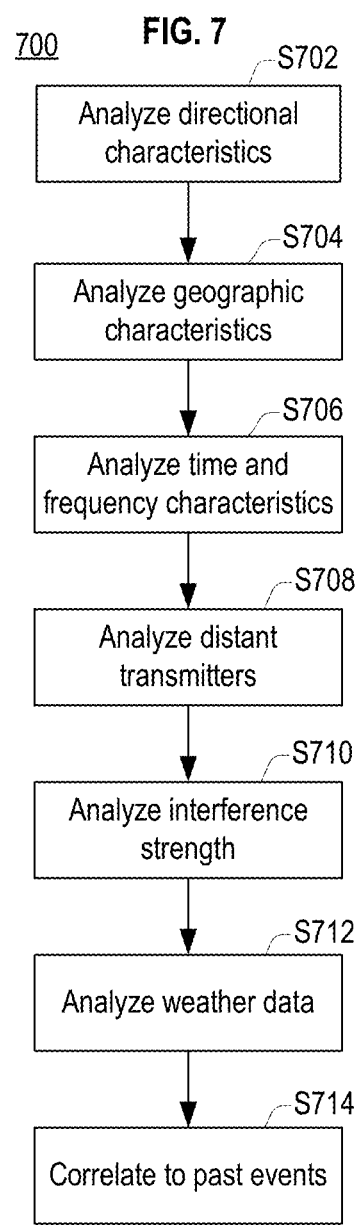

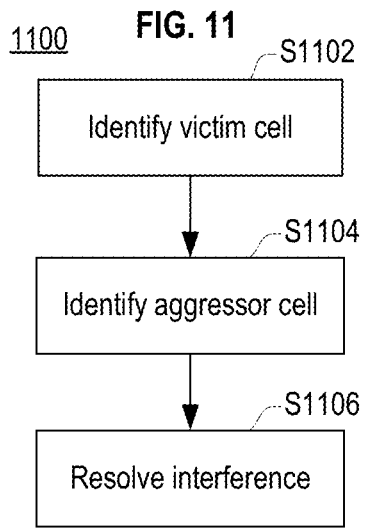
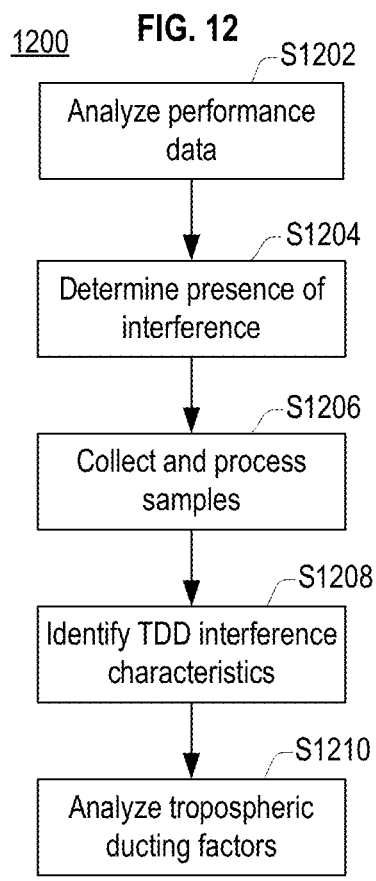
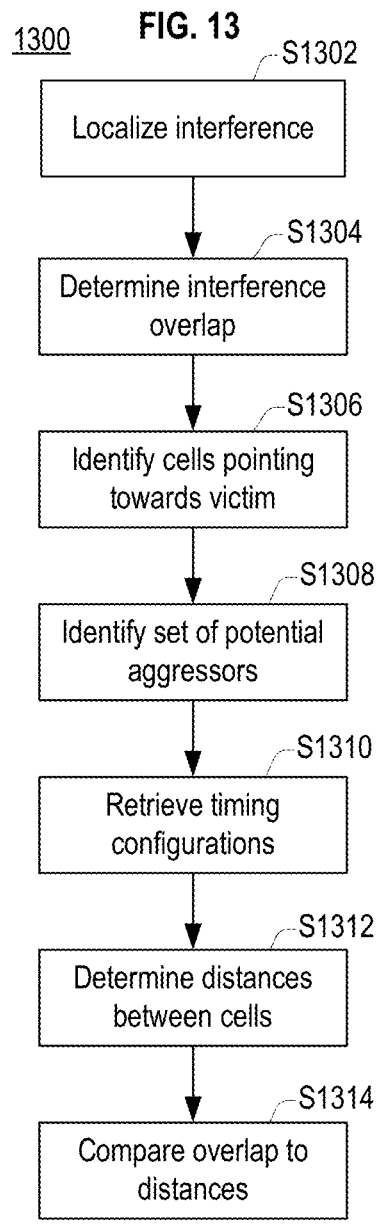

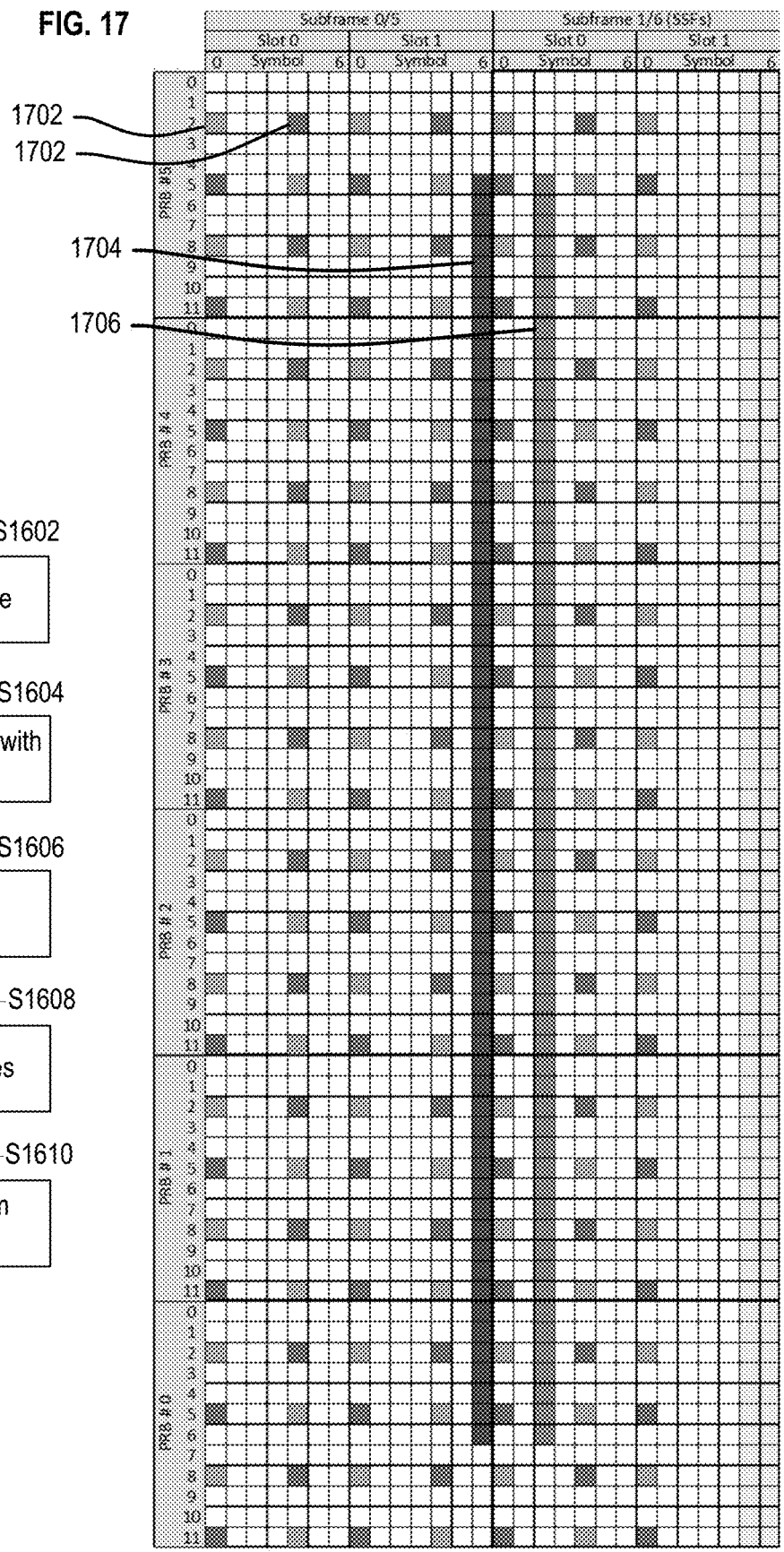

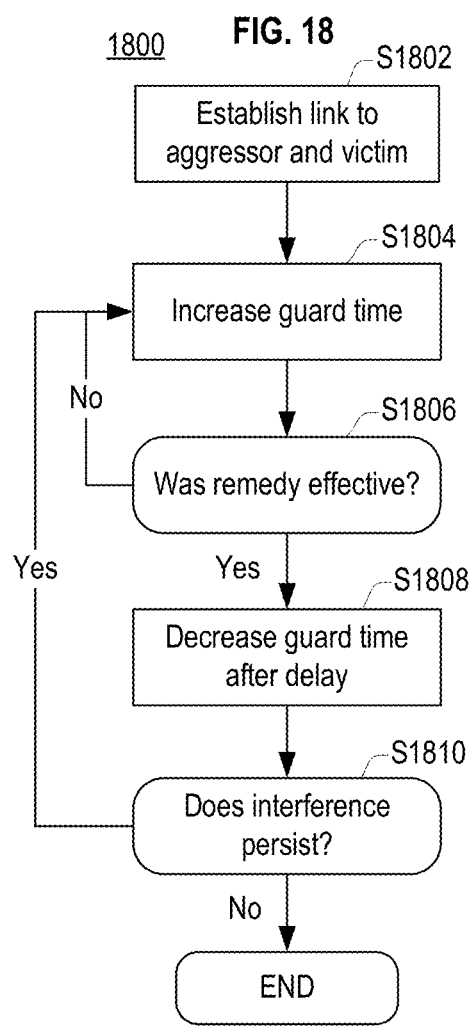

METHODS FOR MITIGATING INTERFERENCE AND MAXIMIZING CAPACITY FOR TIME DIVISION DUPLEX CELLULAR NETWORKS

CROSS-REFERENCES TO RELATED APPLICATIONS

This application claims priority to provisional application 62/837,259, filed Apr. 23, 2019, which is incorporated by reference herein.

BACKGROUND

There are two main ways in which full duplex (bi-directional) communications are provided in wireless communications systems. These are Frequency Division Duplexing (FDD) and Time Division Duplexing (TDD). In FDD systems, downlink and uplink transmitters operate on different frequencies at the same time. In TDD systems, downlink and uplink transmitters operate on the same frequency, but at different times.

In cellular TDD systems, a cell sends data to subscribers during a first time period. Subscriber devices send data to the cells during a second time period. The time during which a TDD cell is transmitting is known as the transmit window. The time during which a TDD cell is receiving is known as the receive window. The transmissions from the subscriber devices must be time aligned so that they arrive at their serving cells during the serving cells receive window.

In cellular TDD systems, all cells must also be time synchronized so that they don't cause interference with each other. The transmit windows and receive windows of cells should not overlap. Cell transmissions are usually higher powered compared to subscriber terminal transmissions, and cell antennas are typically installed above the surrounding "clutter" so the pathloss between cell antennas is less than that between cell antennas and subscriber terminal antennas. If the transmit windows at different cells are not time synchronized, then a cell that is transmitting can cause very high levels of interference towards other cells that are receiving at that time. The receiving cells would have difficulty receiving signals from subscriber terminals at that time.

Ideally a cell's receive window could start immediately after it's transmit window has ended. However, due the finite speed at which RF transmissions propagate in the environment, in practice it is necessary to leave a guard time between the end of cell transmit windows and the start of cell receive windows. The guard time allows for signals from nearby cells to propagate through the environment and arrive at cell receivers without causing interference to signals received from subscriber terminals. Once a sufficient time has passed, where no more nearby cell transmissions are arriving at a cell receiver, the cell receiver may begin receiving subscriber terminal transmissions without interference from other cells.

Guard times are typically optimized for a network when it is initially established. However, the circumstances that are present when guard times are established can be altered by changes to the network and atmospheric conditions.

One natural phenomenon that can lead to unexpectedly high levels of interference is a transient, weather related, RF propagation phenomenon known as tropospheric ducting. Tropospheric ducting can occur when warm and cold air masses lay over one another creating one or more air density interfaces which behave as low RF loss surfaces that reflect RF energy. When these conditions occur, RF signals from very far away from a wireless network of interest can arrive at sufficiently high energy levels to degrade network receiver performance. Normally these distant signals are sufficiently attenuated by high levels of RF path loss created by distance, RF shadowing (e.g. buildings, trees, mountains) and the curvature of the earth such that they do not measurably arrive at the distant wireless network and do not normally create interference problems to the network of interest. However, tropospheric ducting can cause signals from remote sources to present problematic levels of interference energy at wireless receivers. When tropospheric ducting causes RF signals from remote sources to propagate over large distances and cause interference, the resulting interference is commonly referred to as tropospheric ducting interference.

TECHNICAL FIELD

The present disclosure relates to interference mitigation in TDD cellular networks. Embodiments of the present disclosure relate to optimization of network capacity by mitigating interference in times allocated to uplink transmissions.

BRIEF SUMMARY

An embodiment of the present disclosure is a method for a time division duplexed (TDD) wireless telecommunications network that includes determining that a victim cell is receiving interference in an uplink window from downlink transmissions of at least one aggressor cell, determining an identity of the at least one aggressor cell, and increasing a guard time between the downlink transmissions of the at least one aggressor cell and a start time of the victim cell's receive window. The guard time may be increased by changing a special subframe (SSF) setting for the at least one aggressor cell.

In an embodiment, the method includes determining that the interference is associated with a tropospheric ducting event by identifying the presence of at least one tropospheric ducting factor. Determining the identity of the at least one aggressor cell may include receiving a sample of the interference from a base station of the victim cell and determining, from the sample, a reuse code of the at least one aggressor cell. Determining the identity of the at least one aggressor cell may further include identifying a list of cells with the reuse code from the sample, determining respective geographic distances between the victim cell and each cell of the list of cells with the reuse code, estimating respective second distances between the victim cell and each cell of the list of cells based on an end of a downlink window and an end time of interference from the at least one aggressor cell, comparing the respective geographic distances to the second distances, and removing cells whose respective second distances differ from the geographic distances by more than a predetermined value.

Determining the identity of the at least one aggressor cell may include localizing the interference to determine an interference direction, and establishing a set of candidate cells that are disposed in the interference direction, wherein the at least one aggressor cell is determined from the set of candidate cells, as well as removing cells whose azimuth values point away from the victim cell by more than a predetermined value from the set of candidate cells, determining whether cells of the set of candidate cells are experiencing limited duration interference in beginning portions of respective receive windows, and removing cells that are not experiencing the limited duration interference.

In an embodiment, the method includes determining that tropospheric ducting is affecting the network, retrieving data from similar previous tropospheric ducting events, and changing guard times at a plurality of cells based on retrieved data. The method may further include resetting the guard time after a predetermined interval.

Respective X2 connections may be established between the victim cell and the at least one aggressor cell. In such an embodiment, the method may further include, after increasing the guard time, measuring interference at the victim cell, determining whether elevated levels of interference are present in an initial part of a receive window of the victim cell' and when the elevated levels of interference are present in the initial part of the receive window, further increasing the guard time. Aspects of the foregoing method may be performed by a processor of a specially configured spectrum analysis server.

Embodiments of the present disclosure use available forms of network configuration and performance data to detect the occurrence of tropospheric ducting events, and provide information and closed loop processes for resolving these events. This capability is not currently available in commercial wireless network management products and represents a novel approach to detecting and resolving problems caused by tropospheric ducting in real time, or before they occur.

While tropospheric ducting is a natural phenomenon resulting from specific weather conditions, the interference problems caused by tropospheric ducting can be mitigated by taking appropriate actions such as: frequency re-planning, dynamic antenna down tilt optimization, temporary avoidance of heavily interfered channels or even coordination with entities operating the distant networks that cause transient interference problems.

In an embodiment, a method for a wireless telecommunications network includes receiving configuration data, performance data and topology data for the wireless telecommunications network, determining a multi-site interference event affecting at least one channel of a plurality of receivers in the wireless network using the configuration data and the performance data, analyzing a plurality of tropospheric ducting factors for the plurality of receivers, and determining whether the multi-site interference event is a tropospheric ducting event based on the plurality of tropospheric ducting factors. The plurality of tropospheric ducting factors may include an interference directionality factor that indicates a dominant interference direction for the interference received in the at least one channel.

In an embodiment, determining whether the multi-site interference event is a tropospheric ducting event includes determining whether each receiver of the plurality of receivers experiences interference from the dominant interference direction, and determining that at least two of the plurality of receivers are separated by a predetermined distance that is greater than one kilometer. One of the tropospheric ducting factors may be a time factor that includes a start time and a duration, and determining whether the multi-site interference event is a tropospheric ducting event may include correlating the time factor for the plurality of antennas and comparing a result of the correlation to a predetermined value. One of the tropospheric ducting factors may be a distant transmitter factor, and determining whether the multi-site interference event is a tropospheric ducting event may include correlating characteristics of the multi-site interference event with frequency characteristics of the distant transmitter and comparing a location of the distant transmitter to the dominant interference direction.

In an embodiment, one of the tropospheric ducting factors is a weather factor, and determining whether the multi-site interference event is a tropospheric ducting event includes determining a probability of weather conditions favorable to tropospheric ducting at a time that the multi-site interference is received.

In an embodiment, one of the tropospheric ducting factors is an interference power factor, and determining whether the multi-site interference event is a tropospheric ducting event includes determining whether a distribution of interference power of interference in the at least one channel correlates to an expected distribution of interference power from a line-of-sight source. Analyzing the interference power factor may include determining how interference power changes with distance in a direction of interference, and when the interference power is unchanged or increases with distance, determining that the event is a tropospheric ducting event.

In an embodiment, one of the tropospheric ducting factors is a past event factor, and determining whether the multi-site interference event is a tropospheric ducting event includes correlating factors of the multi-site interference event with factors of past multi-site interference events.

In an embodiment, when the multi-site interference event is determined to be a tropospheric ducting event, the process includes storing time and frequency data for the plurality of receivers during the event in a storage medium, receiving weather forecast data for a region encompassing the plurality of receivers, and using the weather forecast data and the time and frequency data to predict the occurrence and the effects of a future tropospheric ducting event.

In an embodiment, when the multi-site interference event is determined to be a tropospheric ducting event, mitigating an impact of the event on the plurality of receivers by changing at least one of an antenna pointing direction or a frequency allocation for at least one of the plurality of receivers.

Embodiments of the present disclosure include a non-transitory computer-readable medium with computer-executable instructions stored thereon which, when executed by a processor, performs one or more of the steps described above.

BRIEF DESCRIPTION OF THE DRAWINGS

FIG. 4 illustrates a process for tropospheric ducting interference in a wireless network.

FIG. 5 illustrates a multi-site interference event.

FIG. 6 illustrates a process for determining the presence of an interference event.

FIG. 7 illustrates a process for analyzing tropospheric ducting events.

FIG. 11 illustrates an embodiment of a process for detecting and mitigating TDD interference in a cellular telecommunications system.

FIG. 12 illustrates an embodiment of a process of identifying a victim cell that is being affected by interference in a TDD system.

FIG. 13 illustrates an embodiment of a process 1300 of identifying a set of aggressor cells that may be causing interference to a victim cell a TDD system.

FIG. 16 illustrates an embodiment of a process for identifying aggressor cells.

FIG. 17 illustrates a subframe structure in LTE.

FIG. 18 illustrates an embodiment of a process for mitigating interference.

DETAILED DESCRIPTION

A detailed description of embodiments is provided below along with accompanying figures. The scope of this disclosure is limited only by the claims and encompasses numerous alternatives, modifications, and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Figure 1:
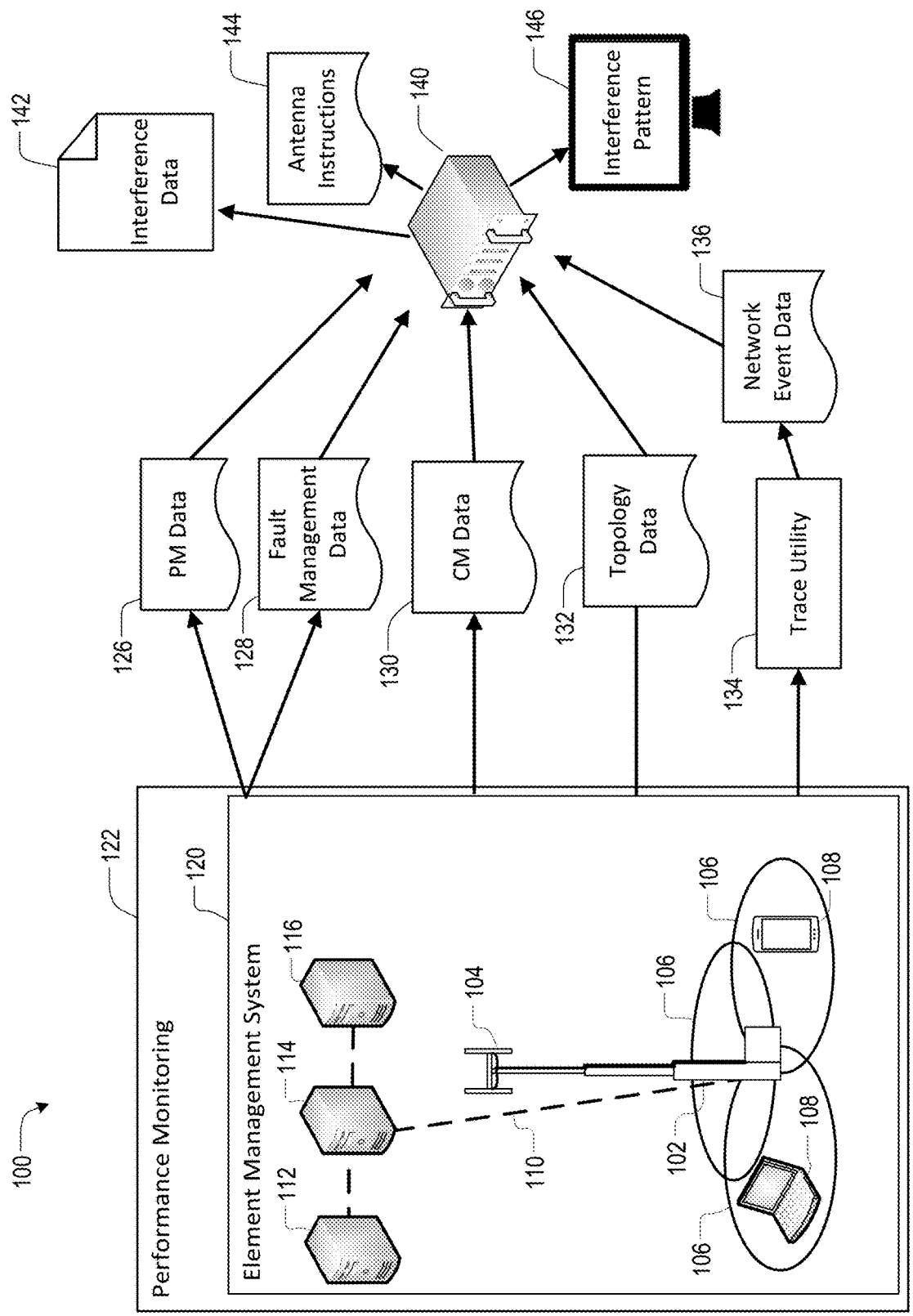
FIG. 1 illustrates an interference detection system according to an embodiment.

Embodiments of the present disclosure include a system for detecting and handling tropospheric ducting interference in a wireless network. An embodiment of such a system 100 is illustrated in FIG. 1.

The system 100 integrates information from available wireless network sources to detect radio frequency interference in the context of a wireless network. Sources of this information, which are hardware elements of a wireless network, are available in typical wireless cellular networks, but may not be connected and configured in the manner suggested by this disclosure. In particular, a spectrum analytics server 140 according to an embodiment may be a novel component of a telecommunications network.

A radio access portion of system 100 may include one or more base stations 102, each of which are equipped with one or more antennas 104. Each of the antennas 104 provides wireless communication for user equipment 108 in one or more cells 106. As used herein, the term "base station" refers to a wireless communications station that serves as a hub of a wireless network. For example, in a Long Term Evolution (LTE) cellular network, a base station 102 may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, NR, etc.

Due to the directionality of some RF antennas 104, each base station 102 may serve a plurality of cells 106 arrayed about the base station site. In a typical deployment, a base station 102 provides three to six cells 106, which are deployed in a sectorized fashion at a site. In other embodiments, one or more base station 102 may be outfitted with an omnidirectional antenna that provides service to a single cell for a given RAT.

Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable wireless computing device that are provided with wireless communications services by a base station 102.

The system 100 may include a backhaul portion 110 that can facilitate distributed network communications between core elements 112, 114 and 116 and one or more base station 102 within a cellular network. In an embodiment, the backhaul portion of the network includes intermediate links between a backbone of the network which is generally wire line, and sub-networks or base stations 102 located at the periphery of the network. The network connection between any of the base stations 102 and the rest of the world may initiate with a link to the backhaul portion of a provider's communications network. A backhaul 110 may include an X2 connection through which base stations 102 communicate with one another directly.

The core network devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eS-MLC), a Home Subscriber Server (HSS), etc. Persons of skill in the art will recognize that core network devices 112, 114 and 116 are different depending on the particular RAT or set of RATs that are present in the network. The core network devices support a radio access portion of the network that includes the base stations 102.

Elements of the system 100 are part of an Element Management System (EMS) 120 and a Performance Monitoring (PM) system 122. The PM system 122 may include base stations 106 as well as core network equipment that collect and process performance data and performance metrics for the network. A spectrum analytics server 140 interfaces with various network components, including components of the PM system 122 and the EMS 120.

The performance monitoring system 122 generates performance data 126 for the wireless network. The PM data 126 may be derived from observations of network performance, which may be reported at a predetermined time interval, e.g., every minute, 5 minutes, 15 minutes, hourly or daily. PM data 126 may include raw event counts (e.g. counts of dropped calls or handover failures during the observation period) or complex derived performance indicators (e.g. noise rise normalized by user loading, Channel Quality Indicator (CQI) distribution statistics normalized by data volume, downlink power information, uplink interference information, etc.). PM data 126 may include raw or aggregated performance data.

In some embodiments, PM data 126 includes data input from a dedicated PM tool, as well as data received directly from EMS 120, or elements of the Operations and Support System (OSS). In an embodiment, PM data 126 may be derived directly from network event data by the spectrum analytics server 140. For example, in an embodiment, when event data 136 is available to the spectrum analytics server 140, the server may aggregate individual events to create equivalent PM counters and Key Performance Indicators (KPIs). Thus, in some embodiments, PM data 126 is derived from sources other than a PM system 122.

Fault Management Data 128 may be transmitted from the PM system 122 to spectrum analytics server 140. Fault Management Data 128 includes, for example, alarm data that indicates performance issues at one or more cell site.

Configuration Management (CM) data 130 is input to the spectrum analytics server 140 from EMS 120. CM data 130 includes the current configuration of various wireless network equipment, such as the configuration of base stations 102 and core components such as Radio Network Controllers.

CM Data 130 is quasi-static and typically only updated as a result of network changes or optimization such as cell splitting, cell ID reassignment, changes in operating frequency or transmit power, etc. CM data 130 may include pertinent information such as cell technology (e.g., 2G GSM, 3G UMTS, 4G LTE, 5G NR) associated with physical and logical network elements, operating frequency, transmit power, reuse codes, type of cell (e.g. macro, micro, pico cell), and other information related to the configuration of the radio network elements.

Topology data 132 is data relating to the location and orientation of network elements, including information such as the antenna latitude and longitude of a base station 102, antenna height, pointing angle for sectorized antennas, antenna beamwidth, site deployment type (e.g. indoor, outdoor, distributed antenna system, etc.), etc. In addition to interference detection and characterization, topology data 132 may be used to aid in correlating PM data 126 and network event data 136 against actual physical locations, and for understanding physical distance relationships between network elements.

Network event data 136 represents discrete network events that are typically logged by network elements. Network event data 136 may include information pertaining to the start and termination of phone calls, information regarding handover of UEs 108 between network cells 106, measurement reports sent by UEs to network elements, as well as periodic reporting at intervals of as low as several seconds or less between reporting periods. Network event data 136 may be available via a continuous streaming mechanism, or recorded and stored in files at network elements that contain, for example, fifteen to thirty minutes or more of network event data. Because event data 136 is reported at intervals of a few seconds, it can be used to determine variance of conditions over time at relatively short intervals, such as five minutes, one minute, 30 seconds, or as low as the reporting interval, which may be less than one second.

Network event data 136 includes call event data, or cell trace data according to LTE terminology. Call trace data includes information identifying makes and models of UEs 108, and is typically used by operators to determine device-specific network faults, e.g. that a particular cell phone model has an unusual rate of handover failures under certain conditions. Examples of call event data 136 include tracking area messages, request for retries, RSSI measurements, and protocol messages. Network event data 136 is not conventionally used for interference detection, characterization, or localization.

Tools supporting the collection of network event 136 data may be configured to collect selected event types, or to subsample the messaging to a subset of active users. Smaller size network event files are useful in measuring implied loading on network data transport such as wireless base station backhaul. When properly configured, network events provide high resolution and near real-time information regarding the operation of targeted network base stations 102, which can be used as part of the interference detection processes described by this disclosure.

The collection point for network event data 136 varies between specific wireless technologies and may vary in vendor-specific implementations. For instance, network event data 136 is typically collected at the RNC entity in 3GPP defined 3G networks (i.e., UMTS, HSPA), but network event data 136 is collected by the eNodeB entity in 4G LTE systems. Network event recordings may be pulled directly from the network elements that store the events by the spectrum analytics server 140, or automatically stored on a separate data storage server, or staging server, such that external systems such as the spectrum analytics server 140 may access network event data 136 without incurring additional data loading on the network elements. Accordingly, it should be understood that network event data 136 may be collected, stored, and retrieved in various ways in different embodiments.

The network event data 136 may be collected by a trace utility 134 that is integrated with a cellular network. Trace concepts and requirements are explained, for example, in the Third Generation Partnership Project (3GPP) Technical Specification TS 32.421.

An embodiment may use network event data 136. In such an embodiment, PIM interference detection does not use input from a dedicated Performance Monitoring system 122, but may derive base station performance indicators directly from network event data 136. In such an embodiment, network event data records may be aggregated.

Embodiments of this disclosure may utilize additional information sources beyond the sources illustrated in FIG. 1, such as information provided by SON (Self Organizing Network) tools, including analysis and insight into neighbor relationships not readily apparent from the sources listed above. Additional external integrations may also include radio frequency propagation planning tools that may be used to enhance accuracy of interference detection and interference localization.

The spectrum analytics server 140 represents a specific processing device that interfaces with one or more of the external data sources described above. The spectrum analytics server 140 may perform one or more of the processes described in this disclosure. In an embodiment, the spectrum analytics server 140 is physically located in an operator's Network Operations Center (NOC). From a logical perspective, the spectrum analytics server 140 is located in the Operations Support System (OSS) plane.

Although FIG. 1 shows the spectrum analytics server 140 as a single, discrete component, embodiments are not so limited. For example, in other embodiments, components of the spectrum analytics server 140 may be distributed among multiple computing entities. In addition, hardware for the spectrum analytics server 140 may perform processes not directly related to detection of interference. In an embodiment, the spectrum analytics server 140 is incorporated into a performance monitoring system 122.

In an embodiment, the spectrum analytics server 140 produces interference data 142 that may be archived or reported to network personnel. The interference data 142 may include results of analysis of interference, especially interference that has origins outside of the immediate physical environment of a cell, e.g. interference that is not caused by local wireless communications. In particular, the interference data 142 may include outputs from one or more of the processes for determining tropospheric ducting interference in a network described by this disclosure.

Additional outputs from spectrum analytics server 140 may include antenna instructions 144 and interference pattern 146. The antenna instructions may be instructions for a remote tilting cellular antenna 104 to change an antenna property such as tilt, azimuth orientation or power in order to mitigate interference. Interference pattern 146 may include visual output data such as a heat map showing interference levels at various geographic locations, predicted weather patterns, and various graphical outputs that allow network operators to visualize elements of network interference.

Although FIG. 1 illustrates a communications system broadly, embodiments of a system for determining tropospheric ducting interference in a wireless network may be more limited. For example, a system for determining tropospheric ducting interference may primarily comprise a spectrum analytics server 140 that receives data from one or more wireless network operator.

Natural forces such as wind mixing air masses of differing temperatures and lack of strong temperature gradients in the atmosphere create relatively homogenous air masses without definable layering. During these typical conditions propagation of radio waves in the VHF, UHF and microwave bands is best described as Line of Sight (LOS) or Near Line of Sight (NLOS), in which higher frequency radio waves, such as that used to support commercial wireless networks, travels in a straight-line fashion.

Figure 2:
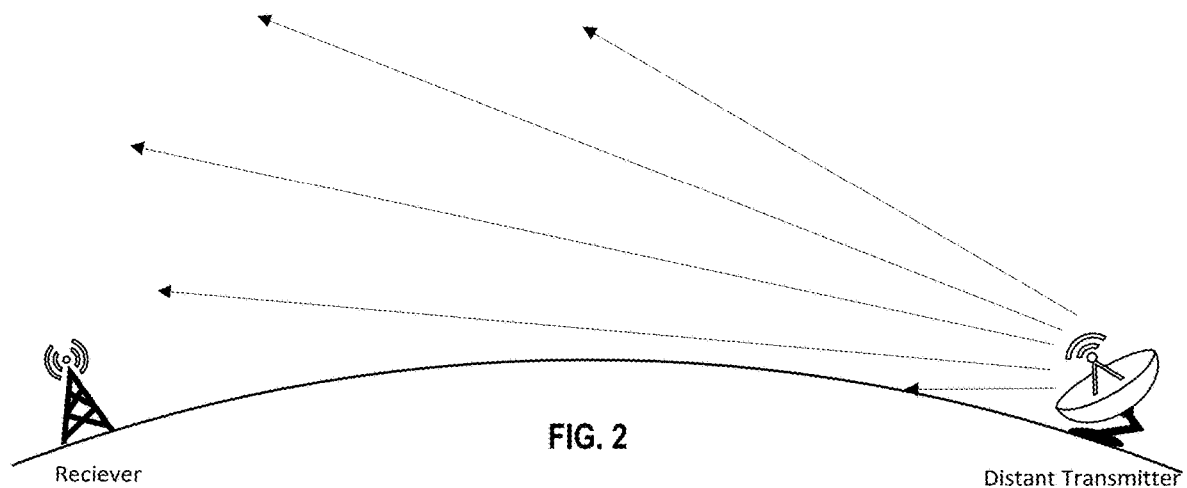
FIG. 2 illustrates typical radio propagation.

Networks shadowed by terrain features such as mountains or by the curvature of the earth will see little or none of the energy transmitted by distant sources sharing the same radio frequency channels under normal weather conditions. This baseline and typical condition is shown in FIG. 2, which illustrates that radio transmissions from a transmitter propagate outwards from the transmitter into the open atmosphere, and radio transmissions that are pointed towards a distant receiver are blocked by the curvature of the earth. While the commercial wireless network is sufficiently distant from the transmitter sharing the same RF channel that the shadowing of the earth blocks signals, other terrain features such as buildings, trees and mountains sufficiently attenuate signals from distant sources that wireless networks do not typically experience significant levels of interference from distant sources.

However, certain weather conditions cause anomalous radio propagation that is different from the normal conditions present in FIG. 2. The typical weather conditions that lead to anomalous propagation include low winds that limit atmospheric mixing, strong temperature inversions between air masses close to the earth's surface and those at higher altitudes, and high levels of moisture in the atmosphere. These conditions most commonly occur in equatorial and tropic regions, but they do occur at higher latitudes with less frequency. Similarly, these conditions tend to occur more frequently during warm humid conditions experienced in summer months and warmer regions.

Figure 3A:
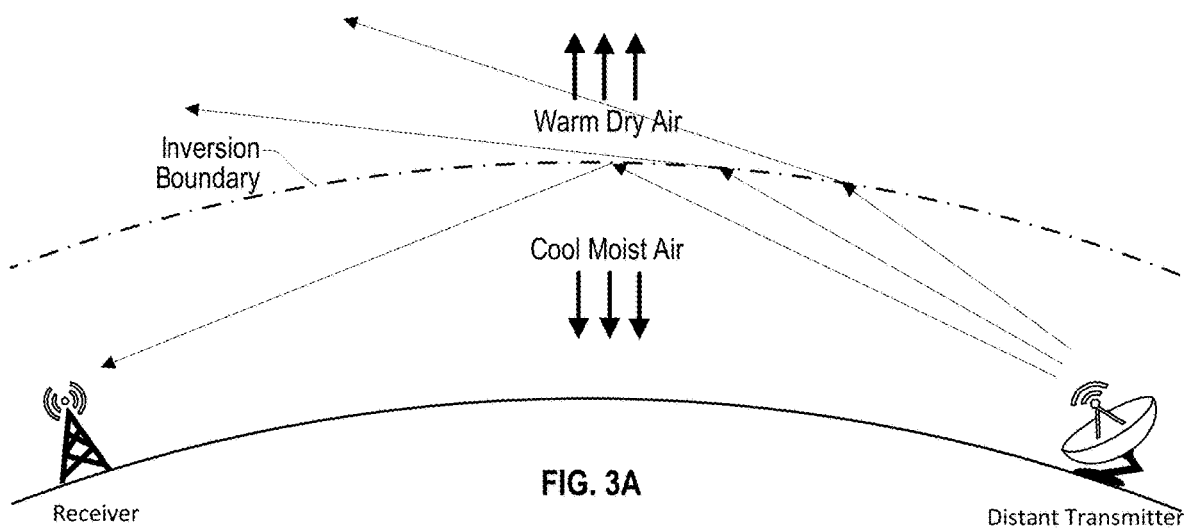
FIGS. 3A-3C show three different respective environments of tropospheric ducting interference.

One of the weather states that is associated with anomalous propagation is the presence of an inversion layer. Temperature and moisture content both influence the index of refraction of the atmosphere, so the boundary between warm and cool air masses in the presence of an inversion layer can cause high levels of refraction for radio waves. In the scenario of FIG. 3A, a cool air mass is captured beneath a warm air mass, and the difference in refractive indices between the air masses causes radio transmissions from a distant transmitter bend or refract off the boundary with minimal signal attenuation.

Depending on the angle at which a radio signal encounters the boundary, the refraction can cause the radio signal to return to earth. In this scenario, the receiver experiences interference from a distant transmitter that is not experienced under normal conditions, e.g. conditions in which an inversion layer is not present. The phenomenon in FIG. 3A is sometimes referred to as super-refraction, and the area under the inversion boundary may be characterized as a duct.

Figure 3B:
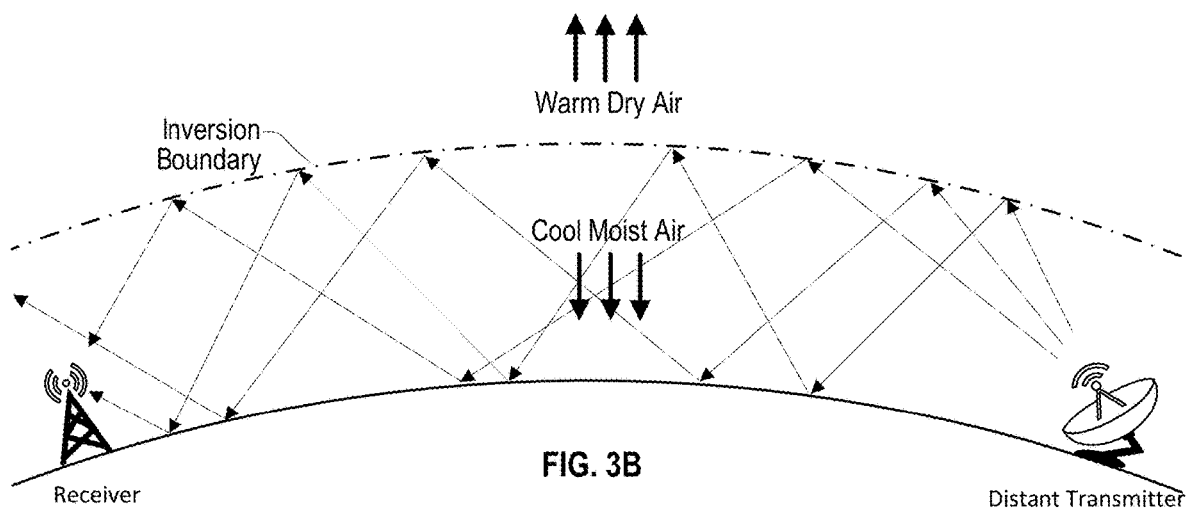

FIG. 3B illustrates a situation where a warm dry air mass that is substantially warmer than the underlying cold moist air mass forms a strong thermal inversion, and with it a strong temperature gradient at the interface of the air masses. In the scenario of FIG. 3B, reflections off the surface of the earth effectively cause the cool air mass below the inversion boundary to perform as a waveguide, or tropospheric duct. Depending on the angle of incidence of the arriving waves and the waves within the ducting region some may be contained and travel along the boundary layer and others may reflect back to earth or out to space. Signals traveling within the ducting region will experience very little attenuation, but signals that bounce one or more times off the earth's surface will experience additional attenuation.

Figure 3C:
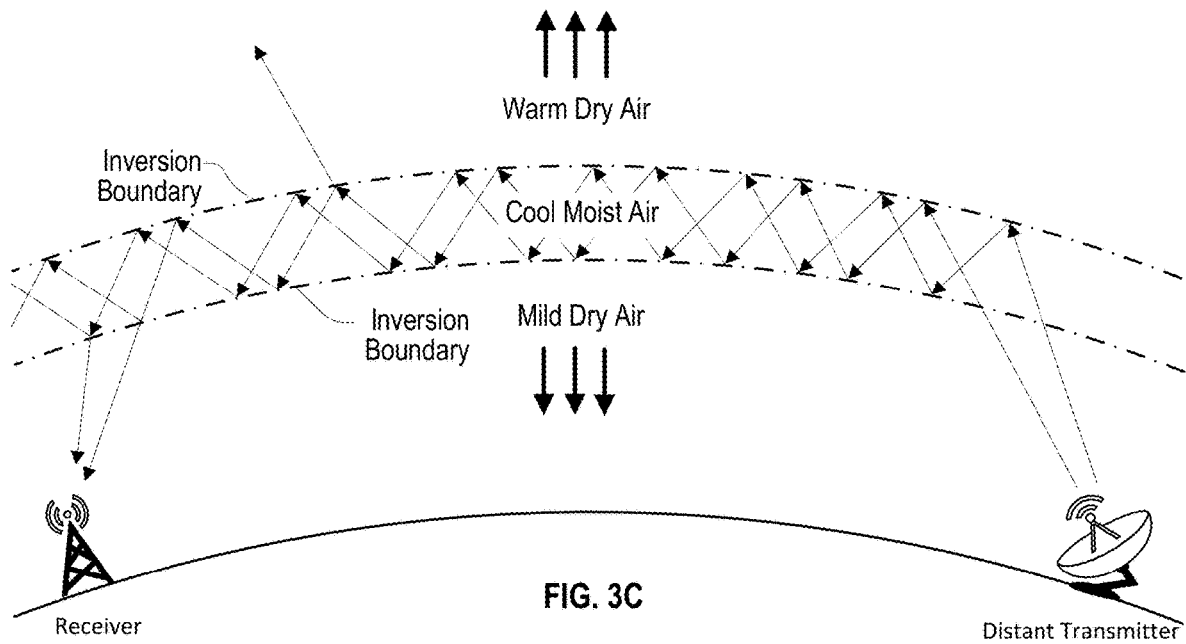

FIG. 3C illustrates another ducting scenario. When a layer of cool moist air mass is trapped between layers of warm dry air, the cool moist air region acts as a waveguide, or elevated duct, to propagate signals through the troposphere. Signals that propagate through an elevated duct experience very little attenuation. The signals can escape an elevated duct when the strength of the inversion boundary is reduced in a particular region, allowing waves to escape in selected areas. Accordingly, an elevated duct can be transport radio waves across relatively large distances and eject the signals onto a distant wireless network. While cellular radio signals tend to propagate for a few kilometers to low tens of kilometers under normal atmospheric conditions, signals can propagate a few tens of kilometers to hundreds or even thousands of kilometers along a tropospheric duct at levels above the noise floor.

For purposes of the present disclosure, the phenomena shown in FIGS. 3A-C are collectively referred to as tropospheric ducting. Tropospheric ducting is a naturally occurring weather-related phenomenon that can allow RF signals to travel much farther than normally expected with relatively low signal attenuation. Because tropospheric ducting is related to weather, the presence of ducting in an area may be predicted with some accuracy based on weather data.

Tropospheric ducting does not in and of itself cause interference to wireless networks. Rather, tropospheric ducting as a phenomenon transports a radio signal to a distant location with minimal attenuation, so tropospheric ducting interference involves a transmitter that uses the same RF channel frequency as a receiver. Tropospheric ducting can occur repeatedly, but interference only occurs if there is a potential interferer in a location that allows the ducting event to carry that energy into a wireless network.

FIG. 4 illustrates a process 400 for detecting and handling tropospheric ducting interference in a wireless communications network. The process includes collecting data at S402, using collected data to identify an interference event at S404, and analyzing tropospheric ducting factors at S406 to determine whether a detected interference event is associated with Tropospheric ducting. A probability of an interference event being a tropospheric ducting event may be quantified at S408, and the quantity may be compared to a threshold value to determine whether the event is a ducting event. When it is determined that an interference event is associated with Tropospheric ducting, the event can be mitigated at S410. Each of the elements of process 400 will now be explained in more detail.

The data collected at S402 may include configuration management data 130 and topology data 132 for a plurality of cells in the network. The data may include physical and geometric data such as a geographic location and elevation of a cell, and antenna configuration information such as an azimuth and tilt, as well as a number of antennas, half-power beamwidth for each antenna, etc. Technologies supported by each cell may be collected, such as which RATs are used by each cell and whether the cell is configured for TDD (Time-Division Duplexing) or FDD (Frequency-Division Duplexing) operations, as well as the frequencies or channels used by each antenna. CM data 130 and topology data 132 may be received on initiation and updated periodically according to changes in network configuration.

Data collection at S402 may further include collecting PM data 126 from PM system 122. The performance data may include regularly reported performance counters and KPIs and high time resolution network event data. The specific performance data may include data related to interference such as SINR values. The PM data may broadly include performance data that can be used to determine that a network is being impacted by interference, including alarm data. The PM data may be received at regular intervals when it becomes available.

Weather data may be collected at S402. The particular weather data may be data that indicates a probability of tropospheric ducting being present, including temperature, pressure and humidity data for one or more elevation in a network region. The weather data may include forecasting data for the probability of tropospheric ducting being present in areas at particular times of day and days of the week. Meteorological techniques for predicting tropospheric ducting are known, and may be employed by an external system and the prediction results imported at S402 in the form of maps or tables associating the probability of radio frequency ducting based on weather data. In other embodiments, raw weather data is imported before prediction and an interference detection system performs tropospheric ducting prediction, or refines or extends an imported prediction.

Data for RF transmitters may be received at S402, including locations, frequencies and power levels for RF transmissions. This information may be used in conjunction with interference data to identify a probable source of tropospheric ducting interference. Accordingly, the RF transmitter data may include data for transmitters that are within a geographical range for which tropospheric ducting can transport the signals to an affected network.

The RF transmitter data may include data for RF transmitters in foreign jurisdictions to the affected wireless network. Radio frequencies tend to be allocated differently in various jurisdictions, so it is possible for a transmitter of a non-cellular technology, e.g. a television broadcast, to affect a distant wireless network by Tropospheric ducting. Therefore, RF transmitter data may be collected for all known licensed and unlicensed sources of RF transmissions that use channels of interest regardless of technology. Tropospheric ducting interference can be transported hundreds of miles from a source transmitter, so the data for RF transmitters may be collected for regions over a hundred miles from a network of interest.

FIG. 5 illustrates an embodiment of identifying an interference event S404, and FIG. 6 illustrates an embodiment of a process 600 of identifying a multi-site interference event. A multi-site interference event is an interference event that affects a plurality of cells within a geographic region. While interference caused by cellular transmissions within a network (inter-cellular interference) tends to be localized to one or a few receivers, tropospheric ducting interference typically affects many receivers within a relatively broad geographic area. In some circumstances, tropospheric ducting interference can affect receivers within an area spanning over a hundred square miles.

Determining whether detected interference is related to the same event may include performing correlations between characteristics of interference received by each cellular antenna. Frequency characteristics, which may include affected frequencies or channels, are correlated at S602, while time characteristics such as start and stop times, duration and periodicity are correlated at S604.

When a high correlation in time and/or frequency is established between interference for a small number of cells that are separated by large distances occupied by cells that do not experience similar interference, the correlated cells are probably not experiencing the same interference event. Therefore, geographic characteristics of received interference are analyzed at S606. Similarly, multi-site interference events typically have predetermined magnitude characteristics—for example, magnitude of local external interference decays with distance from the interferer, while tropospheric ducting interference experiences minimal attenuation across very large distances.

Returning to FIG. 5, cells 504 that received interference with highly correlated interference characteristics are shaded, while cells 502 with uncorrelated interference characteristics are shown in white. The correlated cells 504 are located within a limited geographic area 506. Therefore, process 400 may conclude that the cells 504 within area 506 have experienced the same multi-site interference event. While the grouping of correlated cells 504 in FIG. 5 suggests a localized source of interference that extends in a roughly circular geographic area 506, interference from tropospheric ducting tends to have certain characteristics, as will be subsequently explained with respect to FIG. 8.

Interference localization may be performed at S610. Localization of the interference may be performed, for example, in accordance with one or more of the techniques described in U.S. Pat. Nos. 8,229,368 and 9,942,775 and U.S. application Ser. No. 16/211,181. In some embodiments, interference localization includes estimating a position of point source events impacting multiple network cells, and determination of broad area distant events primarily impacting sectors with common antenna pointing angles (e.g NW, SE, etc.) not point localized in network operating area. Localization may be performed in conjunction with determining that a multi-site interference event is affecting a network to identify local sources of interference that may not be associated with tropospheric ducting interference.

Tropospheric ducting factors may be analyzed for each multi-site interference event at S406. A process 700 for analyzing tropospheric ducting factors and a description of various tropospheric ducting factors will now be explained with respect to FIG. 7.

Antenna characteristics of antennas that are receiving interference may be analyzed at S702. Tropospheric ducting interference tends to be highly directional, so that receive antennas pointing towards the source of interference can receive interference at levels of 10 to 30 dB higher than antennas pointing away from the source of interference.

Figure 8:
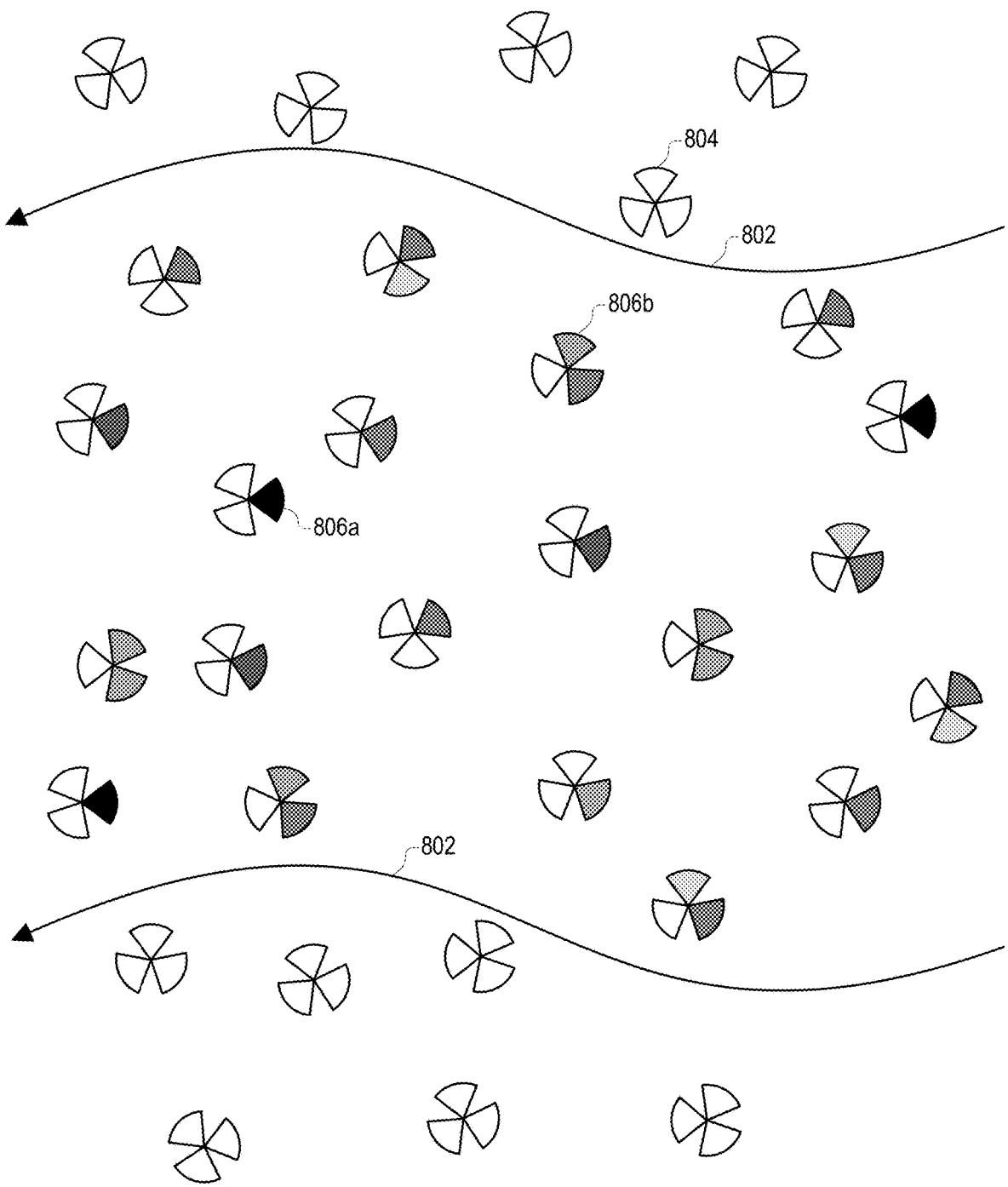
FIG. 8 illustrates a tropospheric ducting event in a wireless network.

A simplified example of this phenomenon is illustrated in FIG. 8, which shows a plurality of three-sector antennas in a wireless network. Lines 802 represent a tropospheric duct transporting RF signals from right to left (as indicated by the arrows), so that cell sites 806 disposed between lines 802 receive tropospheric ducting interference, while cell sites 804 outside of the space between lines 802 do not receive tropospheric ducting interference.

Each of the three lobes of the cell sites represents a receive antenna, and the antennas are shaded according to an amount of tropospheric ducting interference received by the antenna, where black represents a highest level of interference and white represents a lowest level of interference. For example, one antenna of cell site 806a points directly towards a source of tropospheric ducting interference, so it experiences a highest level of interference, while the other two antennas of site 806a point away from the source and receive little interference. In contrast, two of the antennas of site 806b point generally towards the interference source, so they receive moderate levels of interference, while the antenna of site 806b that points directly away from the interference source experiences a lowest level of interference.

FIG. 8 shows that receive antennas pointed towards the source of tropospheric ducting interference experience higher levels of interference, antennas pointing away from the source experience low or undetectable levels of interference, and antennas pointing between those ordinal extremes experience interference levels that are attenuated in proportion to their deviation from the interference direction.

Accordingly, an embodiment of the present disclosure may include determining directionality of the received interference, or an extent to which the received interference correlates with a particular direction. Determining directionality is not specifically limited, but for the sake of example may be accomplished by determining an extent to which interference levels of antennas of cell sites affected by an interference event correlate with a particular direction. A high degree of correlation to a single direction indicates a high probability of tropospheric ducting interference. Moreover, when a multi-site interference event is identified in process 600, the directionality may only be assessed for interference that is consistent with the event, e.g. interference that occurs in specific channels at specific times.

Another factor in analyzing directional characteristics is whether a source of interference can be localized to a specific geography in S610. Directionality that corresponds a specific location suggests a non-tropospheric ducting source of interference, such as an unlicensed transmitter. In contrast, since tropospheric ducts tend to act as waveguides, tropospheric ducting interference is generally experienced from a single direction. Accordingly, analyzing directional characteristics at S702 may include determining whether affected antennas point in a dominant direction, e.g. whether a dominant mode of pointing angles is present.

However, directionality is not a perfect indicator of tropospheric ducting interference. Antennas that point away from a tropospheric ducting interference direction can still experience interference from the tropospheric ducting when the interference reflects off an object towards a receiver. Accordingly, analyzing directional characteristics may account for imperfect data and false positives by discarding outlier data or employing various statistical techniques.

Another characteristic that may be analyzed at S702 is elevation angle. Tropospheric ducts appear and radiate energy downwards, so antenna interference levels tend to increase with higher elevation angles. Accordingly, a high correlation between antenna elevation angle and interference levels indicates a higher probability of tropospheric ducting interference.

Geographic characteristics may be analyzed at S704. tropospheric ducting interference tends to affect large geographic areas, in some cases extending hundreds of miles in a ducting direction, so larger affected areas indicate a higher probability of tropospheric ducting interference.

Because tropospheric ducting interference occurs above the surface of the earth, it can allow RF signals to pass physical barriers that would otherwise block interference, e.g. mountain ranges. Accordingly, terrain geography may be analyzed at S704. When interference is received from a direction that is occupied by a geographical feature that is expected to block interference from that direction, it is more probable that tropospheric ducting interference is present.

Tropospheric ducting interference can be differentiated by local sources of interference by the impacted area. Interference events that only impact a limited area are less likely to be associated with tropospheric ducting. Accordingly, analyzing geographic characteristics may include determining a spread between at least two of the receivers that experience an interference event. Example values of a spread between receivers are distances of 1 km, 2 km, 5 km, 10 km and 100 km. Larger spreads indicate a higher probability of tropospheric ducting, so a quantified probability may be increased in proportion to the greatest distance between receivers that experience the same event.

During widespread ducting events it is possible to receive interference from different interference sources in grossly different compass directions. Generally, these different source interferers will display differing temporal and or spectral characteristics and be identified and analyzed as unique events even though their energy may be coupled into the system by a common tropospheric ducting event. For this and other reasons, time and frequency characteristics of received interference may be analyzed at S706.

In an embodiment, time and frequency characteristics of each event as seen by each impacted cell are recorded and serve as a signature of the particular interference event including information such as which frequencies are impacted and periodicity. Time and frequency data may be analyzed at S706 when correlating those characteristics to detect the presence and extent of a multi-site interference event at S602 and S604.

A time characteristic that may be analyzed at S706 is a time of day of the interference. Tropospheric ducting is a weather-related phenomenon, and weather is strongly influenced by temperature variations of day-night cycles. Thus, tropospheric ducting interference is more likely in certain regions at particular times of day. Time of day may be analyzed in conjunction with weather data as well—a high correlation between the time at which interference begins and the onset of a predicted tropospheric ducting-related weather event increases the probability that tropospheric ducting interference is present. Additional time characteristics include power characteristics over time, which can vary according to weather conditions, and start and stop times. It should be apparent from these examples that even though tropospheric ducting characteristics are described individually, they are analyzed in conjunction with one another.

Distant transmitters may be analyzed at S708. Because RF spectrum is highly regulated, the location of transmitters is often obtainable information. When determining whether an interference event is caused by tropospheric ducting interference, information for transmitters that are located in the direction from which the interference is received can be compared to characteristics of the received interference, where a high correlation between known distant transmitters and received interference increases the probability of tropospheric ducting interference. An example is a television broadcast tower that broadcasts in a channel that is used by a remote wireless telecommunications network. When the remote wireless network receives interference in the same channel from the television tower through a tropospheric duct, the channel and tower location can be compared to the received interference frequencies and direction of interference to determine that the tower is the source of interference.

Interference signal strength may be analyzed at S710. The distribution of interference signal strengths through an interference event transported by a tropospheric duct tends to have different characteristics from line of sight sources of interference, which decays at a known rate of $1/r^2$ from the source. In contrast, the strength of tropospheric ducting interference may be evenly spread across a large area. In some scenarios, the interference levels rise and fall over distance, and may even occur in a highly irregular pattern when weaknesses are present in a duct, allowing higher levels of energy to leak out at certain locations. Accordingly, interference levels that do not decay in an interference direction, especially interference levels that increase with distance, increase the probability of the interference being tropospheric ducting interference.

Weather data may be analyzed for tropospheric ducting characteristics at S712. As tropospheric ducting is highly correlated with specific weather conditions, the time period during which each event was detected is compared to weather history for the impacted region to determine whether tropospheric ducting is probable during that time period. Another embodiment to determine if an interference event is correlated to a tropospheric ducting event is to monitor variations in interference power at S710 for the event over time in the region and analyze if the variations in signal strength correlate to variations in intensities of the ducting forecasts in the same region over the same time.

At a more basic level, tropospheric ducting events can be forecasted using meteorological techniques. A high correlation between a forecasted tropospheric ducting event and an interference event increases the probability that the event is a tropospheric ducting event.

Each time a tropospheric ducting event is detected it may be recorded in a history file, as such events tend to repeat when similar weather patterns occur. A detected event that shares characteristics with recorded historical events, e.g. the characteristics analyzed by process 700, will carry increased confidence levels relative to events detected for the first time. Therefore, a correlation to past tropospheric ducting events may be performed at S714.

The various tropospheric ducting factors analyzed in process 700 may be used to quantify the probability that an interference event is a tropospheric ducting interference event at S408, for example by computing a tropospheric ducting interference score that indicates a probability that an event is a tropospheric ducting interference event. The score may be calculated using the characteristics that were analyzed by process 700. Examples of quantification include performing correlations and calculating or estimating probabilities, some of which has been explained with respect to process 700.

Various examples of specific correlations will now be described for the sake of providing a thorough disclosure. However, it should be recognized that numerous variations are possible, and even within one system specific embodiments may vary between locations according to local conditions.

In an embodiment, for each pertinent characteristic a score is determined based on correlations with expected ducting characteristics or other criteria such as weather-based probability of tropospheric ducting events across the time period of interest. An example rank based correlation is:

$$C_d = \frac{\text{Cov}(raz, razd)}{\sigma raz * \sigma razd}$$

This represents the score for correlation between potential azimuth pointing angles and the actual antenna pointing angles for each cell involved in the detected interference event. In this representation the azimuth bearing of each impacted cell $R_{azd}$ is compared to expected compass pointing directions $R_{az}$ to determine the degree to which impacted cell pointing angles match common compass azimuth directions.

In an embodiment, an azimuth score may be computed by computing mean and standard deviations as $C_d=\text{mean}(az)$, $\sigma(az)$, where a score is based on a standard deviation:

$$\text{Score} = \frac{360 - \sigma(az)}{360}$$

A correlation to common RF channel frequencies may be computed as $C_f=\text{mode}(f), \sigma(f)$, where an RF channel score can be computed as:

$$\text{Score} = \frac{\text{mode}(f) - a(f)}{\text{mode}(f)}$$

A correlation to know distant interference sources can be performed for frequency and direction as a Spearman's ranked correlation of azimuth pointing directions at impacted cells to bearings of potential interference sources:

$$C_{ds} = \frac{\text{Cov}(rDS * rdsd)}{\sigma rDS * \sigma razd}$$

A probability based on weather data may be computed as $C_{dw}=p(WE)$, and a correlation to previously detected ducting events may be computed as:

$$C_{prev} = \frac{\text{Cov}(rPrev * rcurr)}{\sigma rPrev * \sigma rcurr}$$

The correlations may be Spearman rank based correlations, but other statistical methods may be used to arrive at a score for each characteristic.

After computing probabilities, correlations and scores for the tropospheric ducting factors, the values may be weighted based on importance to accurate detection of tropospheric ducting events. The individual weighting factors may be statically determined based on testing or may be adjusted dynamically via adaptive or machine learning processes based on ongoing detection of such events.

A weighted characteristic score may be summed to create a total score that represents total aggregate likelihood that the detected event resulted from tropospheric ducting. This total score is compared to a detection threshold. Total scores greater than or equal to the defined threshold are considered valid tropospheric ducting events. Events meeting or exceeding the detection threshold may trigger automated or manual mitigation actions such as alarms or reports, and pertinent information regarding the detected event are added to the cumulative tropospheric ducting history files for performing future correlations. An example of a simplified embodiment of an aggregated score in which alpha represents weighting of individual event characteristics is:

$$TD_{tot} = \Sigma(\alpha_d C_d, \alpha_f C_f, \alpha_{ds} C_{ds}, \alpha_{dw} C_{dw}, \alpha_{Prev} C_{Prev})$$

Similar to the individual characteristic weights described above, the detection threshold may be optimized over time via manual, adaptive or machine learning approaches based on historical events. In some embodiments, an event may be validated before being added to a database, e.g. by performing a discrete test to confirm that tropospheric ducting is present. In some embodiments, validation is accomplished when multiple factors are present at high levels, including a known transmitter that is oriented in the direction from which the interference is received.

After an event has been determined to be a tropospheric ducting interference event, mitigation may be performed at S410. Mitigation actions may be broadly categorized as automatic mitigation actions which can be performed without human intervention, and manual actions which are performed at least in part by humans. The specific mitigation actions may be different for various situations.

Manual actions may be triggered by a system alarm indicating that tropospheric ducting interference is affecting the network. Manual actions include informing the operator, e.g. by the alarm, that tropospheric ducting interference is occurring, providing reports that summarize the tropospheric ducting factor analysis, and providing data for predicted tropospheric ducting events, including predicted time, severity and geographic location. Embodiments may provide critical information regarding when and where tropospheric ducting interference events are occurring and give operators valuable and actionable characterization information to reduce recurrence or impact of these events by working with regulatory agencies to craft cooperative frequency utilization plans that account for recurring tropospheric ducting events.

Specific characterization details such as when events happened, time duration of tropospheric ducting events, severity and commercial impact of events, impacted frequencies and source direction may be provided to regulatory agencies to create a mitigation plan.

Operators regularly experience sub-performing cells for numerous reasons unrelated to interference propagated by tropospheric ducting, yet without the knowledge that tropospheric ducting is occurring the operators needlessly expend resources attempting to find a more typical network problem. The information provided by embodiments of the present disclosure improves existing field troubleshooting techniques by providing detailed insight into tropospheric ducting events that does not exist in conventional industry practice.

Another aspect of tropospheric ducting interference that can be addressed by embodiments of the present application is event prediction. Because tropospheric ducting events are weather-related and often recur in certain areas, tropospheric ducting event prediction may be facilitated by weather forecasting data as well as historical data for a geographical area. Embodiments maintain a history of detected tropospheric ducting events including event characteristics such as impacted frequencies, event severity, impacted cells or sectors, etc. to predict when tropospheric ducting events will occur and how the tropospheric ducting event will affect a network.

The history of confirmed ducting interference events may be used by machine learning based prediction algorithms to predict the occurrence of ducting interference events from available weather prediction maps. In particular, embodiments may use weather forecasts to predict likelihood of near-future tropospheric ducting events to proactively notify network optimization teams to alter network parameters for duration of expected event, or to automatically perform network parameter adjustments in anticipation of forecasted tropospheric ducting events.

Possible automatic mitigation actions include automatic antenna tilt adjustments to lessen impact of distant interference, automatic load balancing adjustments to steer network users to less impacted cells, automatic temporary or long-term frequency re-assignment to avoid commonly interfered frequencies, and automatic adjustment of TDD time framing parameters in the case of tropospheric ducting induced TDD base-to-base interference.

Interference Mitigation in TDD Networks

In order to maximize the capacity of TDD cellular networks, network operators wish to minimize the amount of guard time configured at each base station. The amount of guard time is typically set based on the distance to the furthest base station from which transmissions may be received. If the furthest away base station is d kilometers, then the amount of guard time required is approximately (d/c) seconds, where c is the speed of light in a vacuum (~300,000 km/sec). In LTE networks, guard times can be set individually for each cell in a network based on its radio environment.

For example, in an urban environment, the furthest away base station from which transmissions can be received may be 10 km away. The required guard time in this case is (10 km/300,000 km/sec)=33.4 us. In another example, in a rural environment, the furthest away base station from which transmissions can be received may be 50 km away. The required guard time in this case is (50 km/300,000 km/sec) =167 us.

In cellular networks, a guard time may be varied in one of two ways. A guard time is effectively a time between the end of transmissions for a transmit interval and the start of transmissions for a consecutive transmit interval. Accordingly, the guard time can be adjusted by varying the time at which a guard interval starts, which is the time at which transmissions of a cell end, or varying the time at which a guard interval ends by adjusting the time at which uplink transmissions start arriving at a cell. If interference is being caused by downlink transmissions of an aggressor cell arriving at a victim cell during its uplink receive window, then the interference may be reduced or eliminated by adjusting the guard time at the aggressor cell by initiating the guard interval at the aggressor cell at an earlier time, or adjusting the guard time at the victim cell by delaying an end of the guard time at the victim cell.

The choice of method for varying the TDD guard time may depend on the specific cellular technology. In LTE systems for example, either of the two approaches of adjusting an end time or delaying a start time may be used for varying the guard time, but the amount by which the guard time may be varied depends on whether the end of the transmission window of the aggressor cell, or the start of the receive window of the victim cell is being varied.

Figure 9:
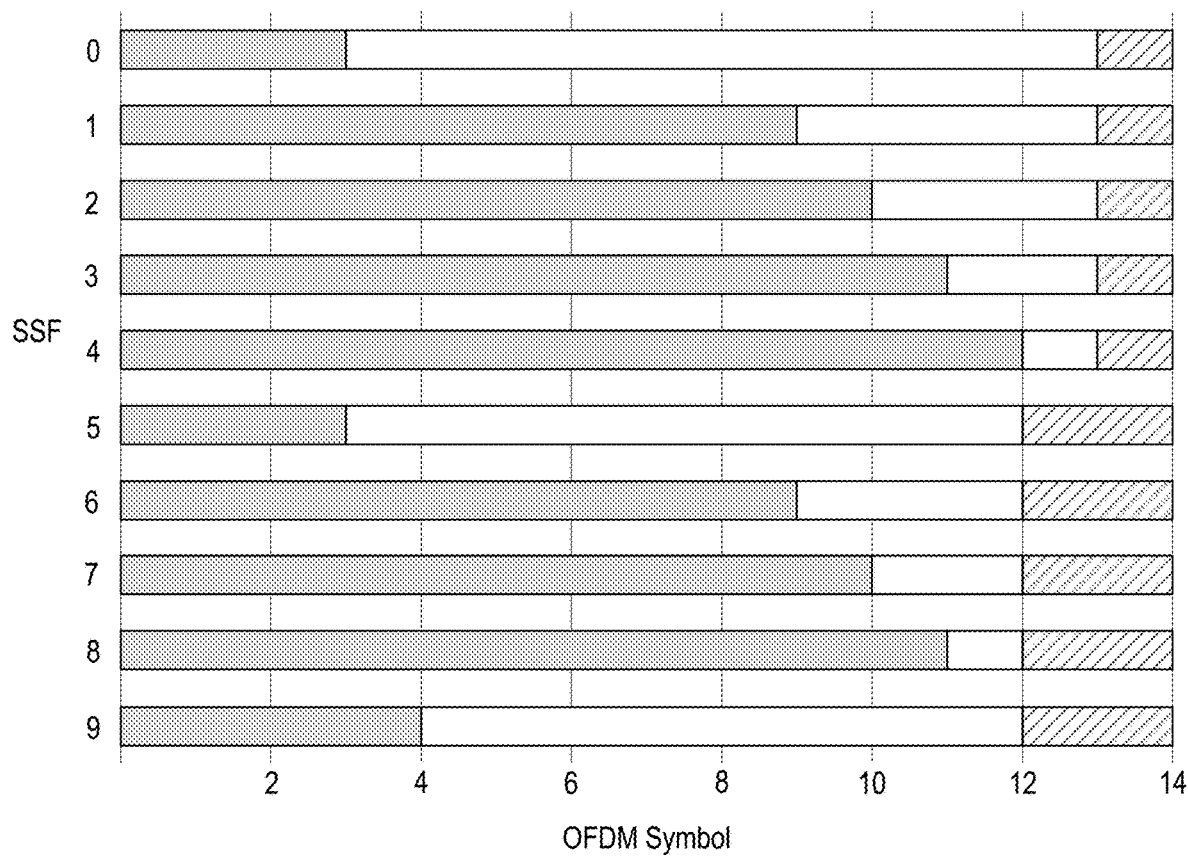
FIGS. 9A and 9B illustrate SSF configurations.

In LTE TDD systems, the guard time is specified by the Special SubFrame (SSF) configuration for a cell. There are 10 SSF configuration options, numbered 0 to 9. These guard times are shown in table form in FIG. 9A, and illustrated graphically in FIG. 9B.

As can be seen in the figures, the guard time is an integer numbers of LTE OFDM symbols. The duration of an LTE OFDM symbol is approximately $1/14$ ms, or ~71.4 µs. 71.4 µs corresponds to a propagation distance of ~21.4 km. The table in FIG. 9A shows the number of OFDM symbols allocated to downlink transmissions, guard time and uplink transmissions in an LTE SSF. As can be seen from FIG. 9A, the maximum number of blank OFDM symbols that can be configured in an LTE SSF is 10. This corresponds to a guard time of 714 us, which corresponds to a distance of 214 km (10*21.4 km=214 km).

FIGS. 9A and 9B also show that LTE facilitates a higher degree of flexibility for increasing guard time by decreasing the number of OFDM symbols for downlink transmissions at an aggressor cell, when compared to decreasing the number of OFDM symbols for uplink transmissions at a victim cell. There are two different values for the number of OFDM symbols for uplink transmissions in an SSF (1 or 2 OFDM symbols) while there are 6 different options for the number of OFDM symbols for downlink transmissions in an SSF (3, 6, 9, 10, 11 or 12 OFDM symbols). Adjusting the guard time by adjusting the number of downlink symbols at an aggressor cell also allows for a greater range of distances to be accommodated.

Figure 10:
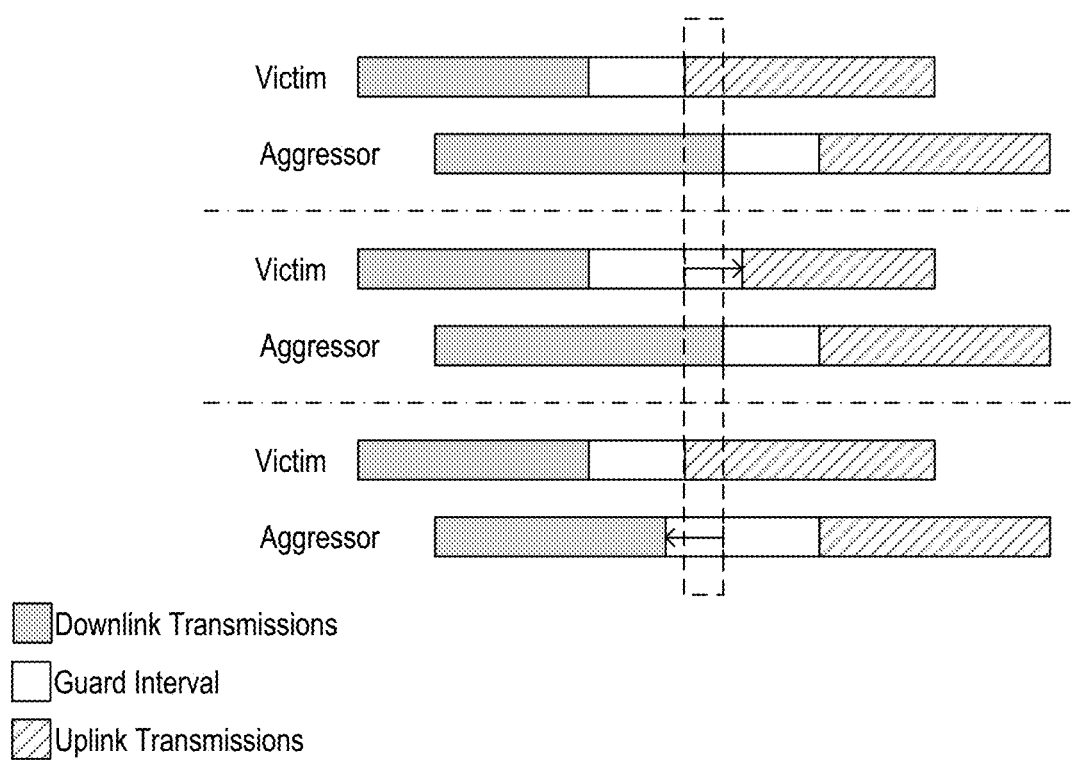
FIG. 10 illustrates TDD interference mitigation by guard times.

FIG. 10 shows three different scenarios that illustrate TDD interference and how SSF configurations can mitigate that interference. The timing shown in FIG. 10 is from the point of view of the victim cell. While the aggressor cell and victim cell each transmit at the same time, the signals from the aggressor cell arrive at a later time at the victim cell, so they are delayed relative to the transmissions at the victim cell.

With normal guard periods configured at the aggressor and victim cells, the aggressor cell's transmissions overlap with the victim cell's uplink receive window. This can be seen in the upper part of FIG. 10, where the downlink transmissions of the aggressor cell overlap with uplink transmissions of the victim cell. As a result, the victim cell would receive transmissions from the aggressor cell in the time indicated by the broken line column.

Interference mitigation by reducing the size of the uplink receive window of the victim cell is shown in the middle part of the figure, and interference mitigation by reducing the size of the downlink transmit window of the aggressor cell is shown in the bottom part of the figure. In both the mitigation cases, it can be seen that the downlink transmissions at the aggressor cell no longer overlap with the receive window of the victim cell. The type of interference shown in FIGS. 9-10, which occurs when a downlink transmission from an aggressor cell is received in an uplink time slot of a victim cell, may be referred to by the present disclosure as "TDD interference."

To mitigate interference by decreasing the downlink transmit window size, e.g., by decreasing the number of downlink OFDM symbols for LTE-TDD at an individual aggressor cell, the aggressor cell should be identified. It is generally straightforward to identify a victim cell, as the victim cell experiences the interference. However, in a cellular network with thousands or hundreds of thousands of cells, it can be challenging to identify which aggressor cells are causing the interference.

Because of these challenges, cellular operators typically configure the same duration downlink transmit window at each cell in their network. For LTE TDD networks, this is done by configuring each cell with the same SSF. The downlink transmission window duration is chosen so that sufficient guard time is provisioned to handle the worst-case distance between an interfering cell and a receiving cell. However, the worst-case transmission window duration may be more than necessary to avoid interference at many cells in the network, so this strategy results in a sub-optimal capacity for the network.

Additional challenges are present when the worst-case distance between aggressor cell and victim cell changes over time. In some cases, tropospheric ducts associated with TDD interference may only persist for relatively short periods of time, e.g., for a few hours per day. When they are present, a cell may receive interference during its uplink receive window from cells from which it normally does not see any interference.

To mitigate this interference, the TDD guard time can be increased by either delaying the start of the receive window at the victim cell or advancing the end the transmit window at the aggressor cell. In the case of LTE TDD cells, this may be implemented by ending the transmit window at the distant aggressor cell earlier. In order to delay the start of a specific cell that is causing such interference, the cell must be identified.

FIG. 11 illustrates an embodiment of a process 1100 for mitigating interference in a TDD system. The process includes identifying a victim cell that is being affected by interference at S1102, identifying an aggressor cell that causes the interference to the victim cell at S1104, and resolving the interference at S1106. Each of the elements of process 1100 will now be explained in more detail as individual corresponding processes.

FIG. 12 illustrates an embodiment of a process 1200 of identifying a victim cell that is being affected by interference in a TDD system. In this and other processes, embodiments of the present disclosure may implement one or more of the elements of the process. Therefore, the discussion of these processes is merely illustrative of various elements that may or may not be performed by a particular embodiment. For example, elements of the processes are broadly related to elements that use indirect measurements, e.g. performance metrics, and direct measurements, e.g. samples of interference. Persons of skill in the art will recognize that various systems may rely on one or the other of direct or indirect measurements, and that other systems may combine both indirect and direct measurements.

In an embodiment, process 1200 includes analyzing performance data at S1202. Performance data may indicate that cells are being affected by TDD interference. Elements of S1202 may correspond to S402 discussed above, e.g. using PM data to determine that a cell is being affected by interference.

Cell performance counters may be used to detect TDD interference. The cell performance counters may be counters that contain measurements averaged over multiple timeslots, or counters that are collected from a single timeslot. The cell counters may contain information on interference measurements over time, interference measurements across frequency, or both.

In some embodiments, samples of uplink transmissions received by a cell are collected and analyzed at S1204. In more detail, a base station may collect time domain baseband I-Q data samples as uplink baseband data from the uplink receive window of a cell. The uplink baseband data may be transmitted to a processor that executes a TDD interference mitigation function. In various embodiments, the processor may be disposed at a base station or in another networked computing element, such as a spectrum analytics server 140, or some other centralized computing entity.

The uplink baseband data may be processed to remove signals received from UEs being served by the cell at S1206. In an embodiment, removing signals from UEs includes recovering and re-creating UE transmissions so they can be subtracted from the received signal. UE transmissions may be recovered by demodulation, forward error correction, or other processes known to persons of skill in the art. Next, the UE transmissions may be re-created by re-modulating the recovered signals, which may include adding channel effects to the signal. The re-created signal is subtracted from the UE baseband samples, resulting in a new set of uplink baseband data samples that contain interference and noise.

A characteristic of TDD interference is consistent interference that is present at the start of uplink time windows, and absent from the remainder of the time windows. Such a pattern may be identified at S1208 in order to determine that the interference detected at S1204 is TDD interference.

In more detail, the presence of interference from other base stations may be determined by low-pass filtering uplink baseband data, and then checking for a step decrease in received power level. The low pass filtering may be performed on measurements aggregated across multiple downlink transmission windows. In an LTE system for example, if a step decrease in received power level is observed in approximately the same location in time across multiple LTE frames, then it is likely that interference is coming from downlink transmissions of one or more other LTE cells.

Because TDD interference is strongly associated with tropospheric ducting, process 1200 may include analyzing tropospheric ducting factors at S1210. Tropospheric ducting factor analysis is explained in detail with respect to process 700 above. When one or more tropospheric ducting factors are present, there is a greater chance that TDD interference is present. Furthermore, the presence of tropospheric ducting factors suggests that aggressor cells may be located at a distance that is substantially further than a distance from which TDD interference would be expected under normal conditions. Accordingly, the presence of tropospheric ducting factors can be used to identify one or more aggressor cell, and may be used to determine appropriate remedies.

FIG. 13 illustrates an embodiment of a process 1300 of identifying a set of aggressor cells that may be causing interference to a victim cell a TDD system. Process 1300 may include localizing the TDD interference at S1302, which may be performed in accordance with S610 discussed above.

Figure 14:
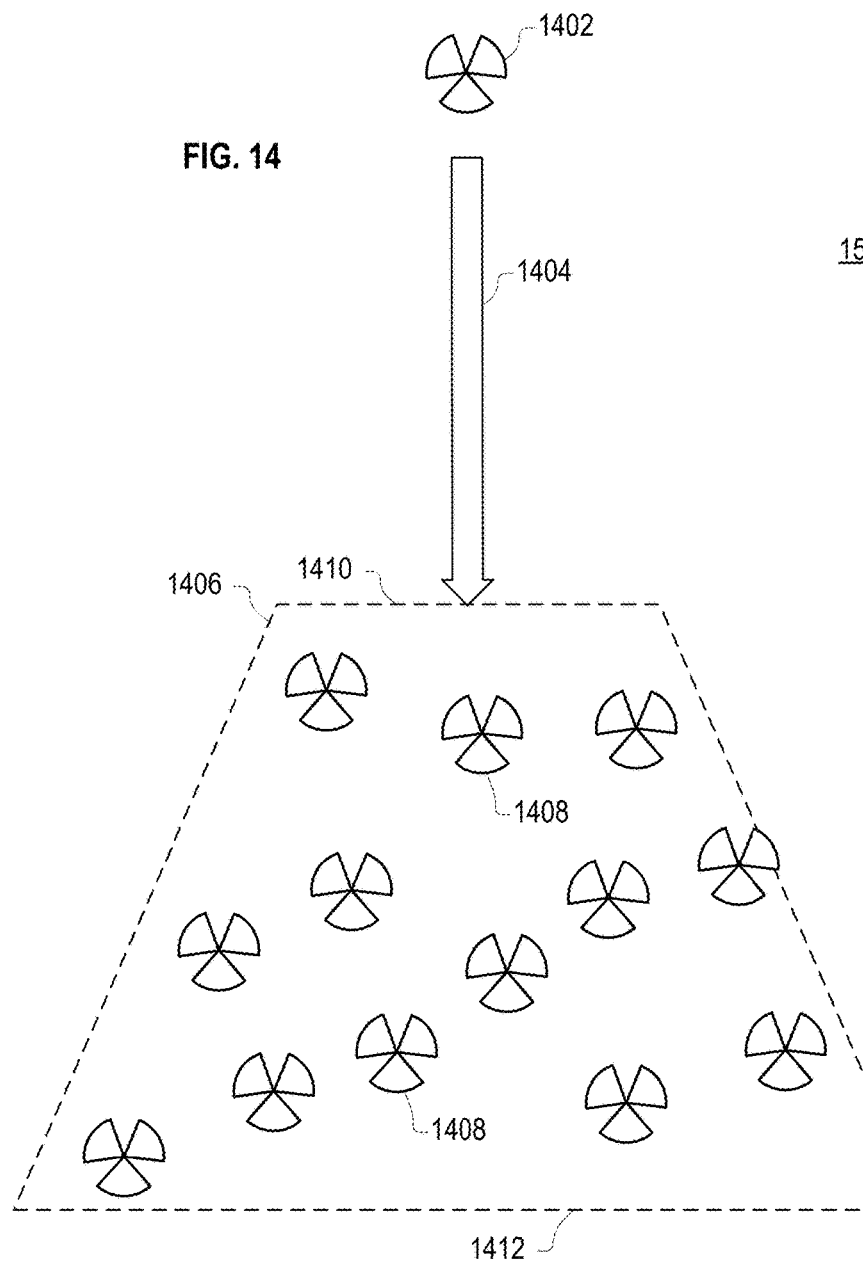
FIG. 14 illustrates an embodiment of identifying a set of aggressor cells.

One outcome of interference localization at S1302 may be a vector 1404 that establishes a direction for a source of TDD interference with respect to a multi-sector cell site. In other embodiments, localization at S1302 may provide a physical location, or a distribution of probabilities that suggest a location of the source of interference. FIG. 14 shows an embodiment in which a vector 1404 indicates a bearing or direction of interference that is affecting a victim cell 1402.

In some embodiments, counters are available that show a level of interference at each of multiple time periods in a guard time, e.g., for each OFDM symbol time in a guard time, are available. In such an embodiment, the counters may be used to determine the time overlap between signals from the aggressor cells and the uplink receive window of the victim cells at S1304.

In some embodiments, an estimate of the time overlap of the TDD interference may be determined from the location of the decrease in received power level relative to the uplink receive window at S1304. This may be performed, for example, on signals that have been decoded at S1206. The interference overlap may be used to determine that the victim cell is being impacted by TDD interference. In addition, the amount of overlap can be used to determine a distance between a victim and aggressor cell, which can be used to identify an aggressor cell.

In LTE TDD systems, the distance to an aggressor cell is a function of the SSF configuration at the aggressor cell and the location in time of the decrease in received power level within the victim cells receive window. For example, the location of a drop in received power level at a victim cell occurs at the same time for the case of interference from a first aggressor cell configured with SSF 1 and for the case of interference from a second aggressor cell configured with SSF 3 that is 42.8 km closer to the victim cell than the first aggressor cell. Accordingly, it is possible to use timing offset in conjunction with SSF configurations to identify an aggressor cell.

Cells that are located in the direction of interference with antenna azimuths that point towards the victim cell are identified at S1306. In some embodiments, cells with azimuth values that are within a predetermined range of a line to the victim cell may be identified, e.g. cells with an azimuth direction that is within 45 degrees of a location of a victim cell. The value of the predetermined range may vary between embodiments, e.g. 15 degrees, 30 degrees or 60 degrees. The azimuth range may vary based on antenna characteristics. However, it is possible for an aggressor cell that does not point towards a victim cell to cause interference to the victim cell, so S1306 may not be performed in some embodiments. In other embodiments, an aggressor score may be used to rank potential aggressors, and pointing direction may be a factor that increases the probability that a particular cell is an aggressor cell.

A set 1406 of potential aggressor cells may be identified at S1306 using data from the interference localization at S1302. The set 1406 may include cells 1408 that are located in the direction 1404 of the interference, and have an azimuth that satisfies the criteria of S1306. The set of cells may be bounded geographically by some tolerance from an interference direction, e.g. a direction plus or minus 5, 10, or 30 degrees. In some embodiments, the tolerance may correspond to the accuracy of the localization used to determine the azimuth 1404 at S1302.

The accuracy of the localization may depend on the specific technique and the amount of data available. Other boundaries may be applied to the initial set such as a minimum distance 1410 from the victim cell, e.g. a distance that is greater than a distance for which existing SSF configurations would prevent TDD interference at a victim cell. A maximum distance 1412 may be established as well, which may be a distance that would account for the highest SSF guard time plus the amount of overlap in the TDD interference.

Figure 15:
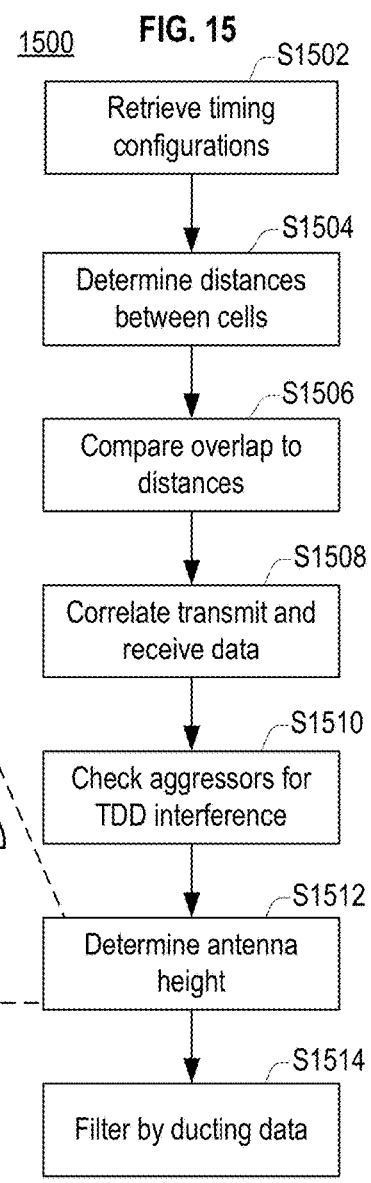
FIG. 15 illustrates an embodiment of a process for refining a set of aggressor cells.

FIG. 15 shows an embodiment of a process 1500 for refining the initial set of aggressor cells from S1308 to identify one or more aggressor cell. The separation between processes for building an initial set and refining a set are not limited to the example embodiments here-in other embodiments, elements of process 1500 can be used to determine an initial set, and elements of process 1300 can be used to refine the set.

TDD timing configurations for potential aggressor cells in the set of aggressor cells may be determined at S1502. For example, in LTE-TDD, SSF configurations for cells in the set of potential aggressor cells may be retrieved from configuration management data for the cells. As seen in FIGS. 9A and 9B, downlink transmission timing can vary substantially between different SSF configurations.

Distances between each potential aggressor cell 1408 and the victim cell 1402 are determined at S1504. The distances between cellular antennas at cell sites may be determined using geographic coordinates of the cell sites.

In an embodiment in which the interference overlap is available from S1304, the overlap is compared to the distances between the set of potential aggressor cells and the victim cell at S1506. In more detail, S1506 may include determining the time overlap that would occur between the downlink transmissions of a candidate aggressor cell and the receive window of the victim cell. In LTE-TDD systems, this can be determined using the SSF configuration of the aggressor cell, the SSF configuration of the victim cell and the distance between the cells.

If the distance between the victim cell and a potential aggressor does not match with the amount of time that it would take radio waves to travel from the end of transmissions at the potential aggressor cell and the amount of overlap of TDD interference within the uplink window of the victim cell, then the potential aggressor cell may be removed from the set of candidates. In some cellular networks, data is detected at resolutions of as little as 1 nanosecond, in which radio waves can travel about 0.3 meters. Therefore, the data available for performing S1506 may be highly accurate, and could be sufficient to positively identify a specific aggressor cell.

On the other hand, in some circumstances, overlap timing is only available at a per-symbol resolution. Symbols are about 71.4 microseconds in duration, during which radio waves can travel about 21.4 kilometers. In such an embodiment, especially in high density areas, S1506 may be less effective for narrowing the set of candidates than when high resolution timing data is available. In some embodiments, candidate cells are removed from the set when the time overlap that would occur is one symbol duration, or 71.4 μs, from the observed time overlap. In other embodiments, cells are removed from the set when the amount by which the overlap timing (and corresponding distance) varies deviates by other values, such as a percentage of the actual geographic distance, e.g. 5 to 20%, or some other predetermined distance or time value.

Transmit data from the identified potential aggressor cells may be correlated with victim cells at S1508, and cells with low correlation may be removed from the set of potential aggressor cells. The transmit data may be correlated with the received interference based on characteristics such as energy level and frequency, as well as time domain data, e.g. whether a potential aggressor cell was transmitting at a time that a victim cell was experiencing interference in corresponding frequencies.

The set of aggressor cells may be analyzed to determine whether they are experiencing TDD interference at 51510. When tropospheric ducting is present, it commonly causes ducting-related interference in both directions. In other words, cells on both sides of a tropospheric duct may experience interference from one another. Accordingly, identifying the presence of TDD interference at cells in the set of potential aggressor cells increases the probability that the aggressor cell is coupled to the victim cell by a tropospheric duct, so cells that are not experiencing TDD interference may be removed from the set.

Antenna characteristics including antenna height and downtilt may be determined at S1512. A transmitter that is located at a relatively low elevation is less likely to cause interference across long distances which would register as TDD interference. Similarly, in flat terrain, antennas that have more downtilt are likely to have lower coupling with tropospheric ducts, and therefore are less likely to cause TDD interference when tropospheric ducting is a factor. Accordingly, cells with low antenna heights and substantial downtilt may be removed from the set. An exception to filtering by downtilt may occur when a cell site is located at a high geographic elevation, e.g. at the top of a hill.

If ducting prediction maps are available, then the set of aggressor cells may be further filtered by the ducting predictions at S1514. If the prediction maps show that ducting is not possible between an aggressor cell and a victim cell, then the aggressor cell may be removed from the set of aggressor cells. In some embodiments, one or more potential aggressor cell may be tested by adapting timing offsets and determining whether the changes affect a victim cell's TDD interference is affected by the changes.

Elements of process 1500 may be implemented by an interference management tool such as a spectrum analytics server 140, or by another system that has access to cell performance, cell configuration and cell topology (e.g. latitude longitude, antenna azimuth, antenna height, and antenna environment (indoor/outdoor)) data. Some or all of the aspects of process 1500 may also be implemented at a base station such as an eNodeB. The base station may raise an alarm if it detects tropospheric ducting, which may trigger further handling of the situation by an interference management tool or other system.

FIG. 16 illustrates a process 1600 of identifying aggressor cells. Elements of process 1600 may be practiced in conjunction with, or exclusive of, elements of processes 1300 and 1500. Process 1600 may be implemented when data samples from victim cells are available.

If a downlink transmission contains signals that are modulated by a cell reuse code, or some other cell identifier, then the reuse code or other cell identifier of an aggressor cell may be identified by searching for and demodulating the signal that has been modulated by the reuse code or other cell identifier. Accordingly, one or more reuse codes may be identified in a data sample at S1602. For example, in LTE, when the Primary Synchronization Signal (PSS), Secondary Synchronization Signal (SSS) or cell reference signals transmitted by an aggressor cell overlaps with the blank subframe and/or receive window of a victim cell, the Physical Cell Identifier (PCI) of an aggressor cell may be identified by searching for and demodulating the PSS, SSS or cell specific reference signals in the received interference data.

FIG. 17 shows the first two subframes of the time-frequency resource grid for LTE TDD systems. The horizontal axis corresponds to time and the vertical axis corresponds to frequency. The figure shows 14 OFDM symbols in each LTE subframe, which has a duration of one millisecond. The subframes are divided into two Slots and each Slot has 7 OFDM symbols. Each OFDM symbol has multiple subcarriers, distributed in frequency with 15 kHz between each subcarrier. The subcarriers are grouped into Physical Resource Blocks (PRBs) consisting of 12 subcarriers each for a total of 180 kHz per PRB. The number of subcarriers contained in an LTE downlink OFDM symbol depends on the operating band of the LTE channel. In a 10 MHz bandwidth allocation, there are 50 PRBs with 50*12=600 subcarriers. In FIG. 17, only the first two PRBs are shown.

LTE cell specific reference signals 1702 are shown as shaded squares in the resource grid. Reference signals are located in the 2nd, 5th, 8th and 11th subcarriers of each PRB in the first and fifth OFDM symbols of a Slot. In the Special SubFrame (SSF) which occurs between the end of downlink transmissions and the start of uplink transmissions, cell specific reference signals are always transmitted on the first OFDM symbol. Cell specific reference signals are also transmitted in the fifth OFDM symbol of Slot 0 in an SSF and the first OFDM symbol of slot 1 in an SSF, if those OFDM symbols are allocated for DL transmissions in the SSF.

The SSS 1704 is always transmitted in the last OFDM symbol of the subframe preceding the SSF. The PSS 1706 is always transmitted in the third OFDM symbol of slot 0 of the SSF. Since the minimum number of downlink OFDM symbols in the SSF is 3 (as shown in FIG. 9a), the PSS is always transmitted in an SSF.

Cell specific reference signals are modulated based on the PCI of the cell. Therefore, the PCI of the cell transmitting the reference signals can be determined by demodulating the cell specific reference signals. The PCI can be expressed as 3*N1+N2, where N1 is the physical layer cell identity group (0 to 167) and N2 is the identity within the group (0 to 2). Demodulating the PSS can extract N2 and demodulating the SSS can extract N1. Even if there is partial overlap in frequency of an aggressor cell's transmissions and a victim cell's receive window, it may still be possible to extract the reference signals from the overlapping frequencies and identify the PCI of the aggressor cell.

When a cell reuse code is identified at S1602, a list of cells in the network that use that code is established at S1604. In various embodiments, the initial list of cells uses all cells within the network, all cells within a pointing direction of the victim cell's antenna, cells within a geographic region from which signals could be expected to be transported by tropospheric ducting to the victim cell, cells that correspond to distances correlated to the timing offset of the TDD interference, etc. Accordingly, the list here could be built or refined using criteria described above with respect to process 1500.

Timing configurations, e.g. SSF configurations, are retrieved for candidate aggressor cells that use the detected reuse code at S1606. An aggressor cell may be identified by comparing the timing of the signals measured at the victim cell. The timing characteristics may include a time at which the interference level decreases, e.g. an amount of TDD overlap, locations of cell reference signals, or the location of signals modulated by a reuse code or cell identifier. One or more of these characteristics may be compared with SSF configurations of the candidate cells and geometric distances between the candidate aggressor cells and the victim cell to identify an aggressor. Reuse planning attempts to space out cells using the same reuse codes as much as possible, so an actual aggressor cell may be identified at S1606.

In a specific example, an SSF configuration for a first candidate aggressor cell is retrieved to establish a time at which the first candidate transmitted a particular reference signal. A time at which a corresponding reference signal was received by the victim cell and a time at which the first candidate transmitted the reference signal are determined, and then an expected delay for signals from the first candidate's cell to arrive at the victim cell is determined as well.

The expected delay is compared to the actual time at which the corresponding reference signal was received by the victim cell, and if the expected delay matches the interval between when the first candidate aggressor cell transmitted the reference symbol and the time at which the victim cell received the reference symbol, the first candidate aggressor cell may be identified as the aggressor cell that is responsible for at least a portion of the TDD interference received by the victim cell.

In some situations, more than one candidate aggressor cell may match the time characteristics compared at S1606. In such circumstances, the candidates may be further analyzed at 1608. For example, multiple samples may be analyzed to determine whether each candidate aggressor cell was actually transmitting on the interfered frequencies when the victim cell received interference. In some embodiments, transmissions may be deliberately scheduled or not scheduled at particular times to confirm a particular candidate.

When TDD interference is transported by tropospheric ducting, it is possible for RF signals to mix in the duct, so that a victim cell receives TDD interference from a plurality of transmitters. In order to discriminate between multiple aggressor cells, when an aggressor cell is identified, its signal may be subtracted from interference at a victim cell at 1610, and reuse codes of other cells may be identified in the sample. In such an embodiment, process 1600 may be repeated to identify additional aggressor cells for a victim cell.

FIG. 18 illustrates an embodiment of a process 1800 of mitigating interference in a TDD system. In an embodiment, a central computing entity, e.g. a spectrum analytics server, initiates wireline links to aggressor and victim cells. For example, when the network is an LTE network, the links may be established to base stations of the aggressor and victim cells over an X2 connection. If the PCI used by the aggressor cell is already used by one of neighbor cells of the victim cell, the PCI value at the aggressor cell may be replaced with another PCI that is not used by any neighbors of the victim cell before establishing the X2 connection. A messaging protocol may inform the aggressor cell's base station that it is causing interference and of the amount by which it needs to shorten its transmit window to remove the interference.

A guard time is increased at S1804. Increasing the guard time may include changing the SSF configuration of a cell to an SSF configuration with a greater guard time, which may include changing one or more of the uplink and downlink timings as indicated in FIG. 9A. The number of blank OFDM symbols in a guard time may be set to provide enough guard time based on the distance between victim and aggressor cells. When a set of cells is identified as aggressor or potential aggressor cells, then guard times may be increased for all cells in the set.

Maximum protection for TDD DL interference in an LTE system is achieved when the aggressor cell uses SSF 0 or 5, which have the smallest number of DL OFDM symbols, and the victim cell uses SSF 0, 1, 2, 3, or 4, which have the smallest number of UL OFDM symbols at the victim cell. If interference is still present with the maximum protected SSF configurations, then other actions may be performed at S1804. For example, applying antenna downtilt, lowering the heights of antennas, or changing antenna azimuth at either the aggressor or victim cells, or lowering the transmit power at the aggressor cell may be performed to mitigate the interference.

The effectiveness of increasing the guard time or other mitigation action may be determined at S1806. In some embodiments, if the guard time did not eliminate interference but did reduce interference, then the guard time may be increased again at S1804. In other embodiments, such as an embodiment in which a set of potential aggressor cells has been established and filtered, the size of the set may be increased, for example by increasing guard times of one or more cell that was removed from the set.

After a delay, aggressor cells that increased their guard times may restore the original guard times at S1808. In some embodiments, the delay time may be a few minutes, or 1, 2, 4, 8, 12 or 24 hours for example. In other embodiments, a delay time may be established based on external inputs, such as weather data indicating that tropospheric ducting is no longer present, or historical data from past events. If increasing the transmit window size at an aggressor cell persistently causes interference towards a victim cell, then the amount of time between increases in the transmit window size of the aggressor cell can be increased using, for example, an exponential backoff strategy.

In some embodiments, TDD interference may be mitigated using techniques other than adjusting a guard time interval. For example, the interference may be mitigated by adjusting a downtilt or transmit power of an aggressor cell, changing a pointing direction of a victim or aggressor cell, blocking a channel, adapting a modulation and coding scheme (MCS), etc.

In an embodiment, any reuse code, cell identifier, or distance information extracted by the above processes may also be passed to an interference management tool such as a spectrum analysis server for further action. The interference management tool may combine the cell reuse code or cell identifier data and distance information with data from ducting prediction maps to aid in identifying the aggressor cells during times of tropospheric ducting. The interference management tool may reconfigure transmit or receive windows at the aggressor or victim cells. A record of ducting-related interference conditions including aggressor cells and effective remedies may be stored in a memory, and these settings may be applied when similar events are detected or predicted at future times.

Although embodiments have been described in the context of tropospheric ducting, the present disclosure is not so limited. Elements of the processes of the present disclosure can be used to detect and mitigate TDD interference that is caused by other events, such as changes to network equipment or a radio environment. In some embodiments, the processes described above can be used to optimize guard intervals.

While the discussion above explains detecting aggressor cells and mitigating cell to cell interference in the context of LTE TDD systems, persons of skill in the art will recognize that the mitigation methods may also be utilized with other cellular TDD technologies (e.g., 5G NR) with appropriate adjustments to the methods to handle the specifics of those other technologies.

Embodiments may use performance data of historically proven tropospheric ducting to complement a weather forecast based tropospheric ducting prediction, to pro-actively notify a network optimization team to alter network parameters when the ducting event starts, and to pro-actively notify network optimization team to change network parameters back to normal when the tropo-ducting event ends. In other embodiments, proactively configuring a network to mitigate interference associated with tropospheric ducting may be automatically performed, e.g. by automatically configuring the network based on settings that were effective for past events. In order to determine the start and end of tropospheric ducting events, at least one cell site at the ducting-prone area may not be adjusted to mitigate interference due to ducting. In this way, the tropospheric ducting interference signature can be continuously monitored, and an end point can be determined as the time when the non-adjusted cell ceases to detect tropospheric ducting interference.

Embodiments of the present disclosure represent a number of improvements to existing wireless communication technology. Embodiments allow detection of tropospheric ducting interference without the use of special test equipment. Embodiments allow detection of tropospheric ducting interference at geographically remote sites without the need to send technicians to those sites. Embodiments allow detection of tropospheric ducting interference without the need to take the components being subjected to the tropospheric ducting interference out of active service. Embodiments allow detection of tropospheric ducting interference inexpensively and on a regular schedule without disrupting the operation of the communication system in which the detection is being performed.

Conventional methods such as drive testing a network after turning off active cells are not practical or cost effective, so they are rarely performed in response to sporadic tropospheric ducting events, even when they are repeating. Embodiments of the present application are an improvement to drive testing techniques not only in terms of accuracy, but also in practical terms of how and when the automated techniques can be applied.

Embodiments of the present disclosure are especially well suited to detecting interference caused by tropospheric ducting remotely in wireless telecommunication systems that are spread out over a large geographical area, where dispatching technicians to remote and at times difficult to access sites to perform interference detection would be expensive or impractical, and where taking system components out of service to perform interference testing might result in a loss of service in areas covered by the system.

This document describes a system and a process for remote detection of interference in wireless networks that is transported to the wireless networks by tropospheric ducting. Embodiments of this disclosure allow operators to automatically detect the presence of tropospheric ducting interference in a wireless communications network. An operator can implement embodiments to easily identify cells being impacted by tropospheric ducting without resorting to service interruptions. A system for determining tropospheric ducting interference may be programmed to determine network characteristics including configuration and performance data and analyze factors associated with tropospheric ducting to determine whether a multi-cellular interference event is caused by tropospheric ducting. In addition, the system may be programmed to implement changes to the network to mitigate the effects of tropospheric ducting interference.

Embodiments of the present disclosure represent improvements to cellular telecommunication technology. Embodiments can analyze and automatically determine that tropospheric ducting interference is affecting a network without requiring network service interruptions, and without installing additional signal generation or energy sensing equipment in network areas.

What is claimed is:

1. A method for a time division duplexed (TDD) wireless telecommunications network comprising:
   determining that a victim cell is receiving interference in an uplink window from downlink transmissions of at least one aggressor cell;
   determining an identity of the at least one aggressor cell; and
   increasing a guard time between the downlink transmissions of the at least one aggressor cell and a start time of the victim cell's receive window,
   wherein determining the identity of the at least one aggressor cell comprises receiving a sample of the interference from a base station of the victim cell, and determining, from the sample, a reuse code of the at least one aggressor cell.

2. The method of claim 1, wherein the guard time is increased by changing a special subframe (SSF) setting for the at least one aggressor cell.

3. The method of claim 1, further comprising determining that the interference is associated with a tropospheric ducting event by identifying the presence of at least one tropospheric ducting factor.

4. The method of claim 1, wherein determining the identity of the at least one aggressor cell further comprises:
   identifying a list of cells with the reuse code from the sample;
   determining respective geographic distances between the victim cell and each cell on the list of cells that uses the reuse code;
   estimating respective second distances between the victim cell and each cell of the list of cells based on an end of a downlink window and an end time of interference from the at least one aggressor cell;
   comparing the respective geographic distances to the second distances; and
   removing cells whose respective second distances differ from the geographic distances by more than a predetermined value.

5. The method of claim 1, wherein determining the identity of the at least one aggressor cell further comprises:
   localizing the interference to determine an interference direction; and
   establishing a set of candidate cells that are disposed in the interference direction,
   wherein the at least one aggressor cell is determined from the set of candidate cells.

6. The method of claim 5, further comprising:
   removing cells whose azimuth values point away from the victim cell by more than a predetermined value from the set of candidate cells.

7. The method of claim 5, further comprising:
   determining whether cells of the set of candidate cells are experiencing limited duration interference in beginning portions of respective receive windows; and
   removing cells that are not experiencing the limited duration interference.

8. The method of claim 1, further comprising:
   determining that tropospheric ducting is affecting the network;
   retrieving data associated with similar previous tropospheric ducting events; and
   changing guard times at a plurality of cells based on the retrieved data.

9. The method of claim 1, further comprising:
   resetting the guard time after a predetermined interval.

10. The method of claim 1, further comprising:
    establishing respective X2 connections between the victim cell and the at least one aggressor cell.

11. The method of claim 10, further comprising:
    after increasing the guard time, measuring interference at the victim cell;
    determining whether elevated levels of interference are present in an initial part of a receive window of the victim cell; and
    when the elevated levels of interference are present in the initial part of the receive window, further increasing the guard time.

12. A wireless telecommunications system comprising a spectrum analysis server, the spectrum analysis server comprising a processor and a non-transitory computer readable medium with instructions stored thereon which, when executed by the processor, perform the following steps:
    determining that a victim cell is receiving interference in an uplink window from downlink transmissions of at least one aggressor cell;
    determining an identity of the at least one aggressor cell; and
    increasing a guard time between the downlink transmissions of the at least one aggressor cell and a start time of the victim cell's receive window,
    wherein determining the identity of the at least one aggressor cell comprises receiving a sample of the interference from a base station of the victim cell, and determining, from the sample, a reuse code of the at least one aggressor cell.

13. The wireless telecommunications system of claim 12, wherein the steps further comprise:
    determining that the interference is associated with a tropospheric ducting event by identifying the presence of at least one tropospheric ducting factor.

14. The method of claim 12, wherein determining the identity of the at least one aggressor cell further comprises:
    identifying a list of cells with the reuse code from the sample;
    determining respective geographic distances between the victim cell and each cell on the list of cells that uses the reuse code;
    estimating respective second distances between the victim cell and each cell of the list of cells based on an end of a downlink window and an end time of interference from the at least one aggressor cell;
    comparing the respective geographic distances to the second distances; and
    removing cells whose respective second distances differ from the geographic distances by more than a predetermined value.

15. The wireless telecommunications system of claim 12, wherein determining the identity of the at least one aggressor cell further comprises:
    localizing the interference to determine an interference direction; and
    establishing a set of candidate cells that are disposed in the interference direction,
    wherein the at least one aggressor cell is determined from the set of candidate cells.

16. The wireless telecommunications system of claim 15, wherein the steps further comprise:
    determining whether cells of the set of candidate cells are experiencing limited duration interference in beginning portions of respective receive windows; and
    removing cells that are not experiencing the limited duration interference.

17. The wireless telecommunications system of claim 12, wherein the steps further comprise:
    determining that tropospheric ducting is affecting the network;
    retrieving data from similar previous tropospheric ducting events; and changing guard times at a plurality of cells based on retrieved data.

18. A method for a time division duplexed (TDD) wireless telecommunications network comprising:
    determining that a victim cell is receiving interference in an uplink window from downlink transmissions of at least one aggressor cell;
    determining that tropospheric ducting is affecting the network;
    retrieving data associated with similar previous tropospheric ducting events;
    determining an identity of the at least one aggressor cell; and
    increasing a guard time between the downlink transmissions of the at least one aggressor cell and a start time of the victim cell's receive window based on the retrieved data.

19. A wireless telecommunications system comprising a spectrum analysis server, the spectrum analysis server comprising a processor and a non-transitory computer readable medium with instructions stored thereon which, when executed by the processor, perform the following steps:
    determining that tropospheric ducting is affecting the network;
    retrieving data associated with similar previous tropospheric ducting events;
    determining that a victim cell is receiving interference in an uplink window from downlink transmissions of at least one aggressor cell;
    determining an identity of the at least one aggressor cell; and
    increasing a guard time between the downlink transmissions of the at least one aggressor cell and a start time of the victim cell's receive window based on the retrieved data.

* * * * *